United States Patent [19]

Beachem et al.

[11] 4,084,237

[45] Apr. 11, 1978

[54] ELECTRONIC LAUNDRY PROGRAM CONTROL APPARATUS

[75] Inventors: Ronald G. Beachem, Montrose; Wayne Ronald Willette, St. Paul, both of Minn.

[73] Assignee: Economics Laboratory, Inc., St. Paul, Minn.

[21] Appl. No.: 782,308

[22] Filed: Mar. 28, 1977

[51] Int. Cl.$^2$ ............................................. G05B 19/04
[52] U.S. Cl. .................................. 364/400; 307/141; 134/58 R; 364/104; 364/120
[58] Field of Search ......................... 235/151.1, 150.1; 307/141, 141.4; 364/900

[56] References Cited

U.S. PATENT DOCUMENTS

| 3,922,889 | 12/1975 | Karklys | 68/12 R |
| 3,937,981 | 2/1976 | Nystuen et al. | 307/141 |
| 4,035,795 | 7/1977 | Fosnough et al. | 307/141.4 |

OTHER PUBLICATIONS

"Sewing Machines With a Memory", Business Week, Oct. 27, 1975, p. 36.

Primary Examiner—Eugene G. Botz
Attorney, Agent, or Firm—Charles E. Golla

[57] ABSTRACT

Electronic laundry machine controller apparatus for automatically synthesizing, in response to single operator program selections, complete laundry cycles or programs from laundry machine control instructions stored, independent of operator selection or control, within an electronically read memory. A read only memory is preprogrammed to store laundry machine control instructions and program synthesis instructions for compiling a large number of different laundry programs, each having laundering steps or operations preconfigured to satisfy the peculiar laundering requirements of a large number of different commercial and institutional users. Program variation select means presettable by the manufacturer or upon installation of the controller enables preselection for execution from the large number of possible laundry cycles, only those laundry machine cycles which best satisfy the user's specific laundering needs. A single user input stimulus to cycle select buttons initiates execution by the controller of a laundry cycle associated with that selection. Addressing and control circuits select and sequentially execute in timed sequence those instructions from memory which correspond to the selected laundry cycle. Each instruction when executed provides digital control signals to laundry machine function control apparatus for performing an identifiable step or operation of the selected program. Unused variations of laundry cycles remain as an integral part of the controller and can be rapidly activated in the event of a change in the user's laundering requirements, without physical alteration or addition to the controller, by simple manual switching of entries into the variation selection switching means.

24 Claims, 4 Drawing Figures

ELECTRONIC LAUNDRY PROGRAM CONTROL APPARATUS

CROSS-REFERENCES

The following publication is relevant to a description of that Programmable Read Only Memory employed in the preferred embodiment of the invention, and is incorporated herein by reference, in its entirety:

Product Specification Information Sheet entitled: HM-76XX *Generic PROM Family*, printed by Harris Semiconductor, a Division of Harris Corporation, P. O. Box 883, Melbourne, Florida 32901, February 1976.

BACKGROUND OF THE INVENTION

1. Field of the Invention

The present invention relates generally to controllers for laundry machines, and in particular to an electric laundry machine controller for automatically synthesizing, in response to a single operator selection, one of a large number of selectable laundry machine cycles or programs. The electronic laundry machine controller of this invention is particularly suitable for commercial laundering applications having unique types or classes of laundry program requirements and where it is desirable to minimize laundry program selection errors by minimizing the number of manual laundry program initiation operations required to be made by an operator of the laundry machine. Such applications may include, but are not limited to hospitals, nursing homes, hotels/motels, restaurants, cafeterias, and the like where large amounts of peculiar types of laundry must be processed.

2. Description of the Prior Art

Most laundering applications in the commercial and institutional fields require unique laundry cycles or programs for laundering various types or categories of laundry peculiar to that particular type of establishment. For example, hotels/motels may require laundry programs specifically designed for washing linens and bedspreads; whereas restaurants and cafeterias would require quite different laundry programs for washing table cloths, napkins etc. Further, there are often significant variances among establishments having the same type or class of laundry as to their respective specific laundering requirements. For example, while hotels and hospitals have the same general laundering requirements for linens, the specific requirements for the mode of execution of the basic laundry cycle or program (i.e. the duration and sequence of washing and rinse operations, the amount and type of detergents, bleaches and additives used, etc.), may vary significantly between the different respective establishments. Accordingly, for a laundry machine controller to accommodate a wide range of general classifications of commercial and institutional applications, and the varied types of laundering needs within those general classifications, it must have the capability of either providing a very large number of different laundry machine cycles or programs, or of providing a plurality of program execution variations for a number of basic classes or types of laundry cycles or programs.

Since the omission or improper execution of an operation or step of a laundry cycle may render the laundry program ineffective or even harmful to the material being laundered, the laundry machine controller must also have a high degree of program execution accuracy and must minimize the possibility of operator error being introduced into the program. This requirement becomes particularly acute in commercial and industrial laundering applications, where due to the large volume of laundry being processed, operators of the laundry machines servicing those facilities are repetitively making program selections over extended periods of time. Particularly in those applications requiring a number of different special program cycles, some of which may involve the addition of special additives to handle hard-to-remove stains or other environmental conditions, it becomes extremely important that the machine be properly activated for performing exactly the desired program. Thus, the cycle select and activation processes should be simple, and require little thought, so as to minimize operator errors due to fatigue, carelessness, or improper judgment.

Besides satisfying the above "use" requirements, a laundry machine controller for universal application in commercial and institutional environments, must be "practical" from installation, cost and service viewpoints. The practicality and use requirements would appear to be contradictory, and have not been simultaneously satisfied by prior art laundry machine controllers.

The majority of laundry machine controllers in the prior art are of mechanical or electromechanical construction. Typical of such controllers are those having a manually rotatable dial marked such that various sectors of the dial identify various distinct wash programs, formulas, or cycles. Such dials are often fixed to rotatable shafts on which a plurality of cams engage a gang of individual switches for controlling various mechanisms and subsystems within the machine. Once the dial is manually rotated to the operator-selected sector, a timer motor which drives the dial shaft and cams through that section is engaged. In this manner, the steps defined by portions of the cams in that dial sector are performed by the laundry machine. Due to the mechanical construction of such controllers, the number of easily distinguishable and unique laundry programs available with such controllers is severely limited. Alternation of an operation sequence or of entire laundry programs of such controllers is not readily performed in the field, and typically requires dismantling of the entire mechanical cam assembly. Another disadvantage of such controllers is that since the laundry programs are defined by manual selection of particular dial sectors, operator errors in program selection or in omission of one or more steps or operations from the beginning or end of a laundry program are commonly made. A number of such manual controllers have program selection dials which operate independently of the mechanism for initiating machine operation. With such controllers, it is quite possible for the operator to forget to select the proper program before actuating the laundry machine, which will result in a repeat of the program previously selected.

One electromechanical laundry machine controller of the prior art, defined in U.S. Pat. No. 3,937,981 by Nystuen et al, owned by the common assignee of this invention, offers a significant improvement over previous controllers. The Nystuen controller employs the concept of synthesizing unique laundry programs from a common set of laundry output function commands, by selecting in response to a set of program synthesis instructions various ones of the output function commands for execution. The respective "set" of program synthesis instructions are selected for activation by a single operator program selection. The output function commands and the program synthesis commands are embodied as mechanical cam elements or switch actuators on a physical surface that may comprise a removable sheet or coating for a rotatable drum. While offering a significant improvement over earlier laundry machine controllers in simplification of program selection and in improved accuracy of program execution, due to its basic electromechanical construction, the Nystuen apparatus is limited in the number of programs and in the variations thereof, which are available for execution, as an integral part of the controller, without physical alteration to the cam surface. Alternation in the field, of programs or variations thereof, requires physical replacement or alteration of the mechanical cam surface. Further, as is true with all electromechanicl controllers of the prior art, the physical cam surface and cooperatively engaging switching members are susceptible to wear and possible loss in accuracy and reliability over extended periods of use.

In attempting to overcome the inherent disadvantages of mechanical and electromechanical controllers, several controllers have appeared in the art which replace the basic motor-driven timers with an electronic controller using digital electronic control principles. Through the inherent reliability of electronic circuitry, these controllers offer significant increased reliability over the prior art electromehcanical controllers. The prior art electronic controllers, however, have not been designed to simplify operator program selection or to automatically synthesize programs in response to a single operator input command. To the contrary, the prior art electronic controllers respond to an require operator synthesis of the laundry program by requiring the operator to enter, via a plurality of manually operable switches, input commands for controlling the various laundry functions to be executed during the course of a laundry cycle or a program. Accordingly, the electronic controllers of the prior art, in their application, are particularly susceptible to human error and misuse, which is of particular concern in commercial and institutional applications where an operator is required to make many of such manual selections over extended periods of time.

The present invention overcomes the above-described disadvantages and inconveniences of prior art laundry machine controllers. The electronic laundry machine controller of the present invention offers a high degree of versatility to accommodate widely varying requirements of commercial and institutional applications, is highly reliable, maintains a high degree of accuracy in program execution, and provides heretofore unobtainable flexibility in laundry machine cycle programing while minimizing operator input error. Through the use of an electronic memory for storing laundry machine control instructions, the controller of this invention provides as an integral part of the controller proper, a large number of different laundry machine cycles or programs, capable of accommodating virtually all of the uniquely different commercial and institutional laundering requirements. Upon installation of the laundry machine controller, either at the factory, or at the user site, that set of laundry cycles or programs which exactly satisfy the peculiar laundering needs of the user, are rapidly preselected or enabled, from the large number of laundry cycles stored in the memory banks by a simple mechanical selection on several manually activated variation select switches, which are normally inaccessible to an operator of the laundry machine. Thereafter, the laundry machine operator, by a single manual operation, selects from a relatively smaller number of available selections, that laundry machine cycle or program which exactly satisfies his peculiar laundering needs. In response to the single operator selection, the laundry machine controller automatically and accurately synthesizes, by selective execution of the laundry machine control instructions stored within the electronic memory, the selected laundry machine cycle. Thus, the possibility of human error in program selection is minimized. Further, the all-electronic nature of the laundry cycle or program synthesis portion of the controller dictates that there are no moving parts to wear or become damaged over extended periods of time and use. Should the user's basic laundry needs change over time, a different set of laundry cycles or programs which more accurately accommodate the changed requirements, can rapidly be made available for selection from the larger number of laundry cycles stored in the electronic memory, by simple manually changing the relative switch positions of the variation selection switches to appropriately preselect the desired laundry cycles. Besides this simple switch selection operation, no physical changes or alterations need be made to the electronic laundry controller.

SUMMARY OF THE INVENTION

The present invention comprises an electronic laundry machine controller, having an electronically readable memory preset to store a plurality of laundry machine control instructions from which a plurality of unique laundry machine cycles or programs can be automatically synthesized. The memory, as presently contemplated, comprises that type commonly referred to or in the art as a Read Only Memory or a Programmable Read Only Memory; however, other types of comparable electronically addressable memories which otherwise satisfy the requirements of this invention are included within the spirit and intent of this invention. The memory has a plurality of addressable memory storage locations, capable of storing a plurality of laundry machine control instructions which are pre-fixed or preset into the respective memory storage locations independent of operator input selection or control, and are not destroyed upon being read-out.

Each laundry machine control instruction comprises a plurality of logical control or command signals suitable for controlling, when read, operation of laundry machine "function control" apparatus for such laundry functions as laundry tub and/or agitator rotation, hot and/or cold water fills, detergent, bleach, softener additive injection, etc. The laundry machine control instructions may, as an integral part thereof, also contain timing information which, when read, controls the time duration of execution of the respective command signals embodied within that laundry machine control instruction (i.e. would control the length of active addressing or read-out of that particular laundry machine control instruction). Each laundry machine control instruction preferably contains all of the commands required to control the respective laundry machine function control apparatus for the entire duration of a complete "step" or "operation" of a larger laundry "cycle" or "program."

The controller automatically synthesizes laundering cycles or programs in response to a single operator input selection stimulus, by locating those laundry machine control instructions stored within the memory which have been predetermined to be identifiably associated with the particular input selection, and by successively reading those identified instructions, in predetermined ordered manner, thereby providing ordered sequential contol commands to operate the laundry machine function control apparatus. The controller locates from the memory, those instructions required to synthesize the selected laundry machine cycle or program, by means of addressing and control circuits, the operation and configuration of which depend upon the particular organization method employed to store the respective laundry machine control instructions within the memory. Conversely, the particular instruction addressing and control scheme desired, will dictate the particular mode of instruction storage organization within the memory. While a particular instruction storage and associated addressing technique which employ identifiable "addressable blocks" of memory instructions will be disclosed in the preferred embodiment of the invention, hereinafter described, it will be understood that other instruction storage organization and addressing techniques can equally well be devised within the spirit and scope of this invention.

In a perferred embodiment of practicing this invention, those laundry machine control instructions which collectively comprise the commands required to execute the various complete laundry machine cycles or programs are respectively stored in sequential order within identifiably distinct addressable blocks of memory storage locations. Addressing and control circuits are provided for locating, in response to the single operator cycle selection input stimulus, that "block" of memory instructions which corresponds to the input cycle selection. The addressing and control circuits execute the selected laundry cycle or program by sequentially or serially addessing and reading the instructions stored within the selected block of memory locations. Upon reading each laundry machine control instruction, the controller directs the laundry machine function control apparatus to perform all of those operations required to execute one step or operation of the composite laundry cycle or program. In the preferred embodiment of the invention, each laundry machine control instruction also contains timing commands which control the time duration of execution of that step or operation corresponding to the laundry machine control instruction being read.

An alternate embodiment of the invention, for example one in which microprocessor control techniques are used, may employ several different memories or identifiable portions of the same memory for storing the "program" or "address" instructions separate from the "laundry machine control" instructions. For a controller constructed according to the principles of this embodiment of the invention, a plurality of different laundry machine control instructions, each of which can be executed to perform a set or operation of a number of different laundry cycles or programs, are grouped together within one portion of the memory capabilities of the controller - each laundry machine control instruction being uniquely addressable, but not identifiably associated with any particular laundry cycle or program. Each of the laundry machine control instructions, besides containing digital commands for the laundry machine function control apparatus, can also contain instructions for the address and control circuits as to identifying that memory instruction which is to be next executed (i.e. "jump" instructions). A second set of memory instructions, separate from the laundry machine control instructions, commonly referred to as "program" or "address" instructions are grouped, or at least have uniquely addressable starting instructions, so as to be identifiably associated with one of the selectable laundry cycles or programs. Each group or set of such program or address instructions contains an ordered sequence of digital commands for the address and control circuits of the controller, to provide when sequentially executed, instructions to the address and control circuits as to which one or ones of the laundry machine control instructions are to be read at any one time. According to this embodiment of the invention, the address and control circuits of the controller locate, in response to a single operator input selector stimulus, that set of program instructions identifiably associated with the input selection, and sequentially execute those identified program instructions, to read in response thereto, the laundry machine control instructions in a "pick-and-choose" manner, to synthesize the selected composite laundry cycle or program. With use of such techniques, subroutines may be configured for execution of sequential steps or operations which are common to a number of laundry cycles or programs. It will be understood that many configurations of such controllers as described in this embodiment are possible, particularly those which use microprocessor control principles, all of which are embodied within the spirit and scope of this invention, since both the laundry machine control instructions and the program or address instruction commands for synthesizing composite laundry cycles therefrom, are preset or hardwired within the memory independent of operator input selection or control.

In the preferred embodiment of the invention, the laundry machine control instructions for executing different basic types of classes of laundry programs are stored within uniquely addressable "blocks" of memory storage locations. The laundry machine control instructions within an identifiable block of such memory locations, contain instructions suitable for synthesizing a number of different variations of the basic type or class of laundry program identified therewith. For example, if those instructions identified with a particular "block" of memory are associated with synthesizing laundry cycles or programs for "non-iron fabrics," different variations of the basic non-iron cycle or program may be directed to such varying laundry conditions as: non-iron laundry with light soil; non-iron laundry with light soil requiring cold water final rinse; non-iron laundry with medium soil; non-iron laundry with restaurant or food produced soil; non-iron laundry with heavy soil requiring bleach; etc. - each variation of which is peculiarly configured to satisfy the laundering requirements of a particular commercial or institutional application.

Each of the laundry machine control instructions within a particular memory storage block includes a digital variation identifier code which identifies that instruction with one of the cycle variations capable of synthesis from the instructions within that block of memory storage. The controller includes variation select switches, one for each of the blocks of memory locations, which can be preset at the factory or by a service man upon installation of a controller, for generating digital variation identifier codes which correspond to those identifier codes carried by the laundry machine cycle instructions. Each variation select switch is presettable to provide only one variation identifier output code at a time, from the plurality of possible codes associated with that block of memory. The particular code preset into the variation select switches is made so as to coincide with those specific laundering variation requirements of the user, with respect to the basic type or class of laundry cycle or program represented by that block of memory.

A plurality of input cycle select switches are provided, one each being associated with a respective one of the blocks of memory instructions. An operator need only to press a single input selector to effect execution of a complete laundry cycle or program. Upon receipt of an input selection stimulus, the addressing circuits enable for activation that block of memory instructions identifiably associated with the input selection. The addressing circuits automatically begin sequential execution of the instructions within the enabled block of memory. Comparator circuits compare the variation indentifier code of the instruction being read, with the preselected variation identifier code from the variation select switches. Upon coincidence of the compared codes, the digital laundry machine control commands contained within the laundry machine control instruction being read are transmitted to the laundry machine function control apparatus for a time duration identified by the read laundry machine control instruction - to execute a complete step or operation of the selected laundry machine cycle. Upon completion of that step or operation of the laundry cycle, the addressing and control circuits advance the addressing of the memory to read that instruction stored at the next sequential memory address location within the selected block of memory instructions. If the comparator circuits indicate non-coincidence between the read instruction variation identifier code and the preset variation identifier code, the address and control circuits inhibit transfer of command signals from the read instruction to the output control circuits, and rapidly sequence through successive memory storage address locations until an instruction is read which has a variation identifier code which coincides with the preselected variation identifier code for that block of memory. In this manner, a laundry cycle or program which corresponds to the preselected variation of the basic type of laundry cycle selected is automatically synthesized by the controller - all by means of a single operator input selection.

While the invention will be described with respect to particular types of logical circuits and with respect to a particular method of addressing instructions within the memory for synthesizing laundry machine cycles, it will be understood that other types of logical circuits and addressing techniques can equally well be employed within the spirit and intent of this invention. Further, while one method of providing a large number of laundry cycles or programs from which preselection of a relatively few cycles or programs which best satisfy the user's requirements will be described (in particular the method of providing a plurality of variations of a plurality of basic types or classes of programs), it will be understood that other techniques of providing such extended laundry cycle or program selection availability can be readily configured within the spirit and scope of this invention. These and other variations of the invention will become apparent to those skilled in the art upon a more detailed description of a preferred embodiment of the invention.

BRIEF DESCRIPTION OF THE DRAWING

Referring to the Drawing.

DESCRIPTION OF THE PREFERRED EMBODIMENT

Figure 1:
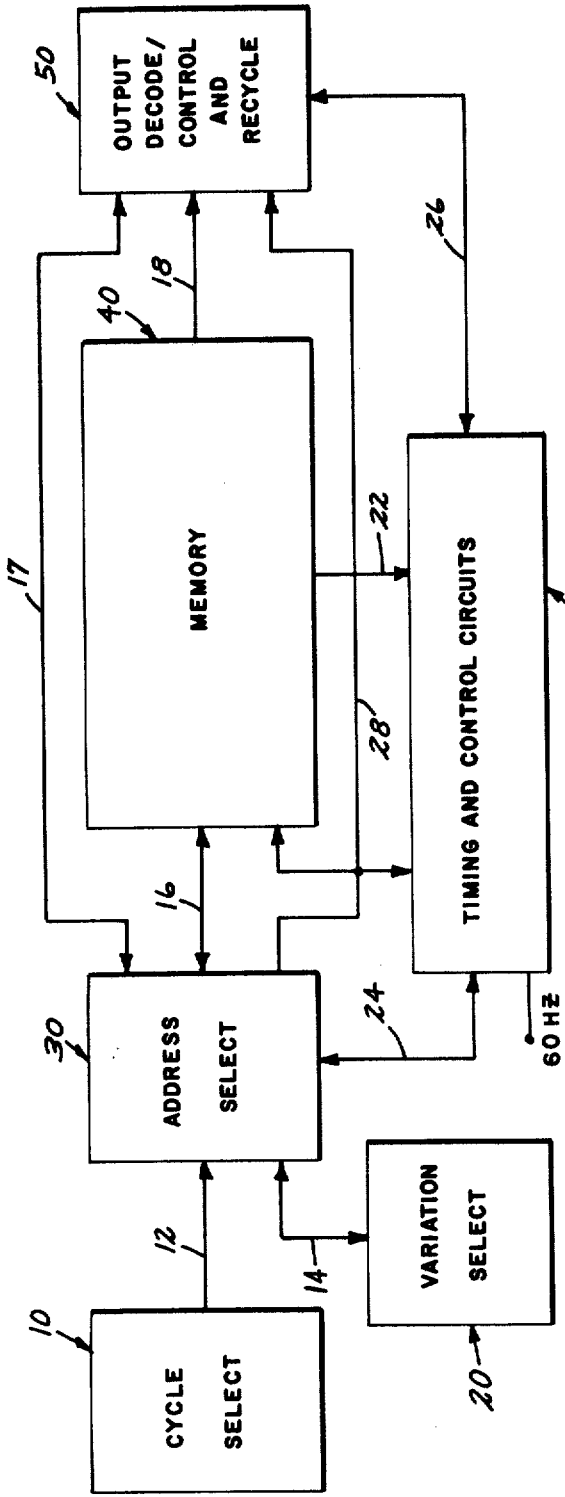
FIG. 1 is a block diagram representation of the functional blocks comprising the electronic laundry machine controller of the present invention.

Referring to the Drawing, wherein like numerals represent like parts throughout the several views, FIG. 1 illustrates in block diagram form, a preferred embodiment of an electronic laundry machine controller constructed according to the principles of the present invention. Block 10 represents the control system cycle select function which, in the preferred embodiment, comprises a plurality of manually operable push-button switching elements by which an operator may select one of a plurality of different laundry machine cycles or programs. The cycle select functional block converts the manually entered stimuli to an electrical signal identifiably associated with the selected laundry machine cycle or program, which is applied by means of a signal flow path 12 to a memory address select functional block 30. In the preferred embodiment of the invention, the memory address select circuits 30 also receive input signals by means of a signal flow path 14, from a variation select functional block 20.

The variation select functional block 20 comprises a plurality of setable switching elements which may be preset by the manufacturer of the laundry machine controller, either prior to delivery of the apparatus to the user, or by a service man at the installation site of the controller apparatus. The variation select functional block 20 significantly increases the program variation capacity of the controller by providing a plurality of different variations of each of the basic laundry machine cycles or programs selected by the user via the cycle select functional block 10. The individual cycle or program variations are generally preset to correspond to the laundering needs peculiar to the type of installation in which the laundry machine is to be utilized (e.g. for hospitals, motels, hotels, etc). The settable switching members of the variation select functional block 20 are intended to be physically located at a position within the chassis (not illustrated) which houses the controller, so as to be inaccessible to an operator of the laundry machine. The variation select circuits 20 receive input signals from the address select circuits 30 by means of the signal flow path 14, to energize that variation select switching member or members associated with the particular laundry cycle or program selected, as will be hereinafter described in more detail.

The address select circuits 30 provide output signals by means of a signal flow path 16 to a memory bank 40. In the preferred embodiment, the memory bank 40 comprises a Programmable Read Only Memory commonly known in the art as a PROM. The PROM may be of any well known configuration, generally having the capability of storing a plurality of presettable logical instructions which can be "read" by proper addressing of the respective memory storage locations within the PROM. The required laundry machine control information as hereinafter described, is preset into the memory bits by any appropriate method which corresponds to the physical properties of the particular memory employed. In the preferred embodiment, the PROM 40 comprises two 512 × 8 memory arrays which are addressed in parellel to provide a 16 bit output. In the preferred embodiment, each of the memory arrays is functionally subdivided into eight uniquely addressable 64-byte blocks of memory, with each of said memory blocks being functionally associated with one of the selectable unique laundry cycles or programs. Throughout the specification it will be understood that the terminology "signal flow path," as identified in FIG. 1, may refer to one or a plurality of physical circuit paths between the functional circuit blocks interconnected by that signal flow path. Referring to FIG. 1, it will be noted that the signal flow path 16 also carries return feedback signals from the memory functional block 40 to the address select functional block 30.

Output signals from the plurality of output ports of the memory banks 40 are carried by means of a signal flow path 18 to an output decode control and recycle circuit 50. The signals carried by the signal flow path 18 control the various physical laundry machine functions through the output decode control circuit 50, as will be hereinafter described in more detail. The recycle circuits contained within the output decode/control and recycle functional block 50 also communicate directly with the address select functional block by means of a signal flow path 17.

The memory banks 40 also provide an output control signal which is carried by means of a signal flow path 22 to circuits within the timing and control functional block 60. The timing and control circuits 60 provide, in response to instructions received from the memory banks 40, timing and control signals to the remaining functional circuits within the controller, for coordinating operations of the respective circuits, as will be hereinafter described in more detail. Electrical signal transmission between the timing and control network 60 and the address select circuits 30 is achieved by means of a signal flow path 24. Electrical signal transmission between the timing and control network 60 and the output decode/control and recycle functional block 50 is achieved by means of a signal flow path 26.

A master enable signal, to be hereinafter described in more detail, which is generated within the address select functional block 30 is transmitted from the address select circuits 30 to the memory bank 40, the timing and control circuits 60 and the output decode/control and recycle circuits 50 by means of a signal flow path 28.

Figure 3:
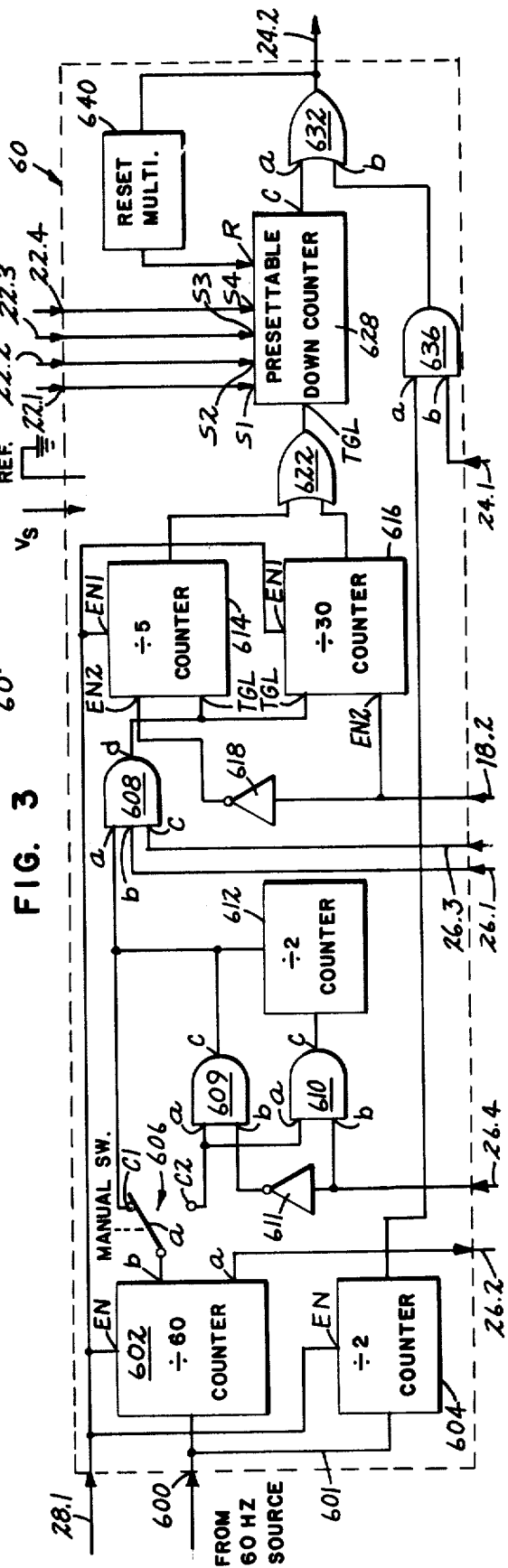
FIG. 3 is a detailed schematic representation of the timing and control circuit portion of the controller of the present invention, disclosed in FIG. 1.
Figure 2:
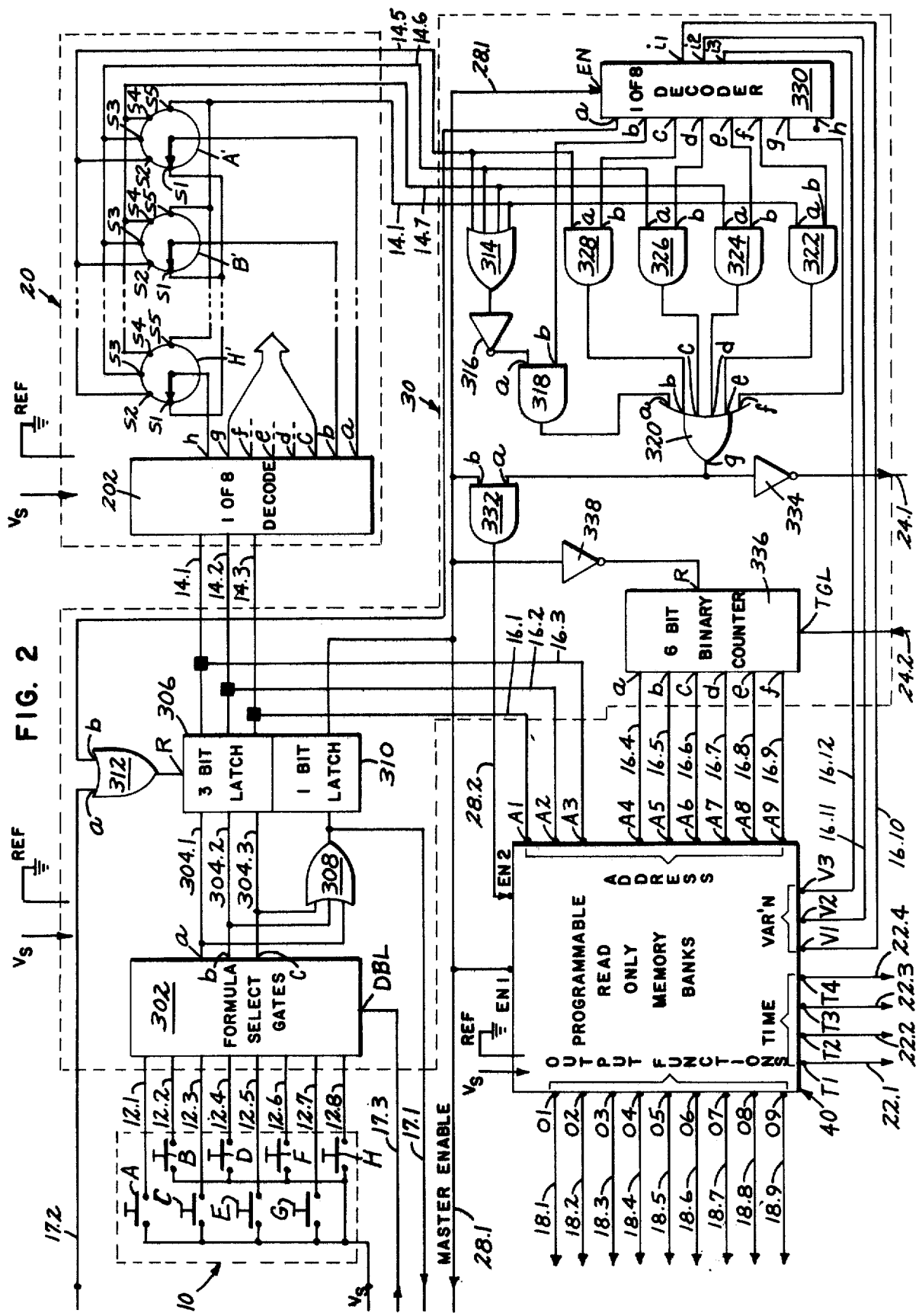
FIG. 2 is a detailed schematic diagram of the cycle select, the address select, the memory and the variation select portions of the controller of the present invention, disclosed in FIG. 1.
Figure 4:
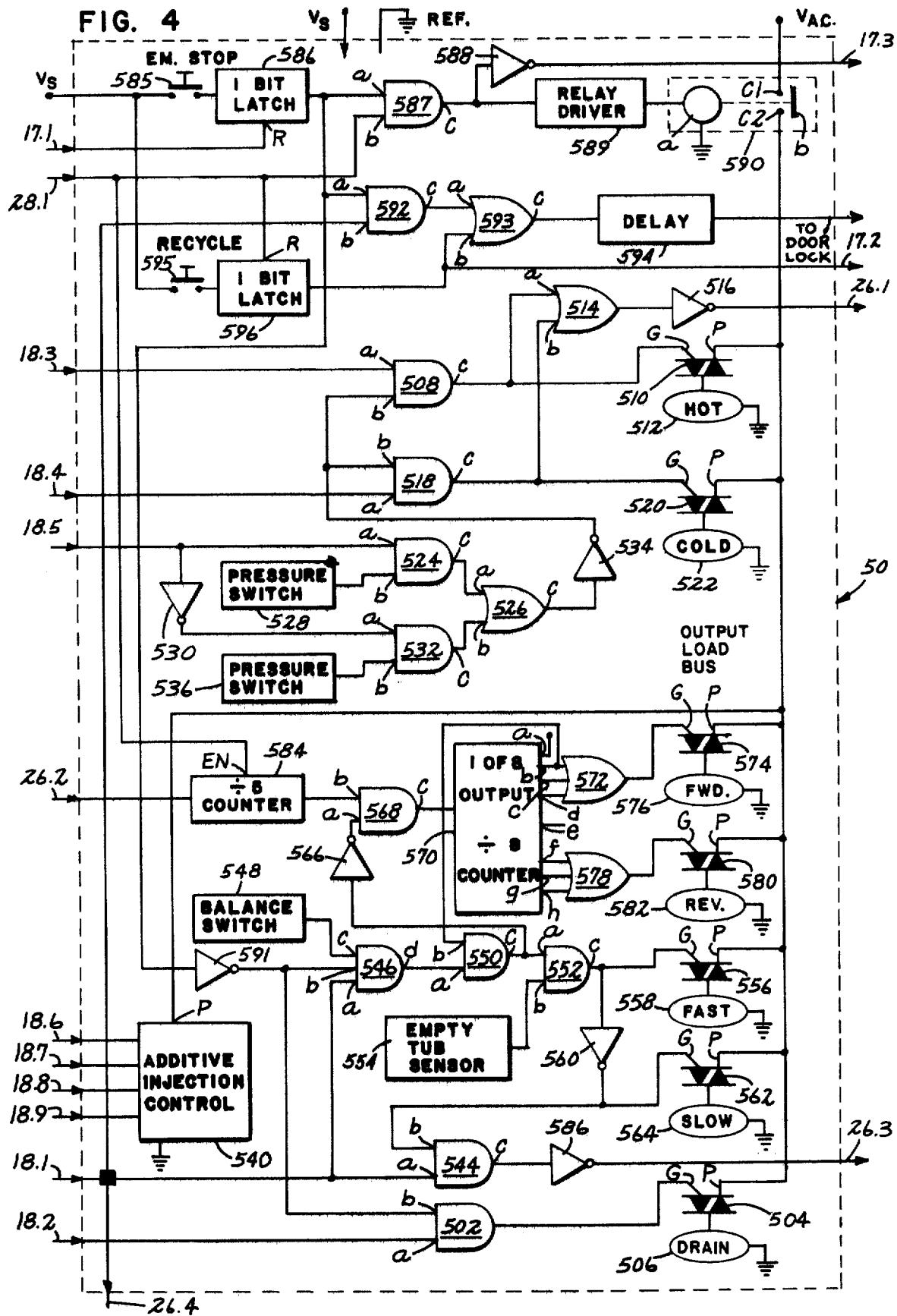
FIG. 4 is a detailed schematic representation of the output decode/control and recycle circuit portion of the controller of the present invention, disclosed in FIG. 1.

FIG. 2 represents a detailed schematic representation of those circuits illustrated in block diagram form in FIG. 1, with the exception of the timing and control circuit 60 (illustrated in detail in FIG. 3), and the output decode/control and recycle circuit 50 (illustrated in detail in FIG. 4). In the preferred embodiment, the controller circuitry is entirely digital, and employs primarilly Complementary-MOS (CMOS) integrated circuits. It will be understood, however, that other types of digital circuitry may be equally well employed within the spirit and intent of this invention.

While not specifically illustrated in the Drawing, it will be understood that appropriate power sources are provided for energizing the various digital and control circuits throughout the controller apparatus.

For providing continuity between the functional block diagram of FIG. 1 and the individual detailed schematic diagrams of FIGS. 2–4, where possible, the numeral identification assigned to respective signal flow paths in FIG. 1 will be retained throughout the detailed schematic diagrams. For example, where a basic signal flow path comprises a plurality of individual conductors or sub-signal flow paths (as represented in FIGS. 2–4), each of the individual conductors or sub-signal flow paths which comprise the base signal flow path will be preceded by that numeral indicator identical to that illustrated in FIG. 1.

Referring to FIG. 2, the cycle select functional block 10 comprises a plurality of manually operable push-button switching members designated respectively as A–H. In the preferred embodiment, the cycle select functional block 10 comprises 8 such select switching members, each of which is associated with a unique laundry machine cycle or program. One terminal of each of the direct switching members A–H is directly connected to a power source labelled Vs. The second terminal of each of the switching members A–H is connected by means of a conductor (12.1–12.8 respectively) to input terminals of a Formula Select Gate functional block 302 within the address select functional block 30. The formula select gate functional block 302 has a plurality of output terminals 302a–302c and a "disable" input terminal labelled DBL. The formula select gate functional block 302 comprises any appropriate logical circuit suitable for converting an electrical pulse received on one of the input conductors 12.1–12.8 into a three-bit binary encoded output signal, and to block passage of the encoded three-digit signal to the output terminals 302a–302c whenever an appropriate "disable" signal is received at the DBL input terminal.

The encoded binary signal is carried by means of a plurality of conductors 304.1–304.3 to the input terminals of a three-bit latch 306, and by means of an OR gate 308 to an input terminal of a one-bit latch 310. The signal output from the OR gate 308 is also applied by means of a conductor 17.1 to circuits within the output decode/control and recycle functional block 50, as hereinafter described. In the preferred embodiment, the three-bit and the one-bit latch circuits 306 and 310 respectively are physically mounted within a common integrated circuit and are commonly reset by means of a signal applied to their common "reset" input terminal, designated as "R" in FIG. 2.

The reset toggle signal applied to the reset (R) input terminal of the latch circuits 306 and 310 is provided by means of an OR gate 312, having a pair of input terminals 312a and 312b. An input signal is applied to the terminal 312a of the OR gate 312 by means of a second conductor 17.2 comprising the signal flow path 17. A third conductor 17.3 of the signal flow path 17 provides the "disable" input signal to the formula select gates 302, as hereinafter described. The three-bit and one-bit latches 306 and 310 respectively operate to maintain, until reset, a continuous output signal representing that information received in pulse form at their respective input terminals. The output signal from the one-bit latch 310 comprises the "master enable" signal of the controller system, which is distributed throughout the system by means of the signal flow path 28.1. The master enable signal is directly applied to a first enable input terminal "EN1" of the PROM 40. In the preferred embodiment, the first enable input terminal EN1 of the PROM 40 enables one of the two memory banks of the memory functional block 40. The second memory bank within the memory functional block 40 is enabled by means of a second enable input terminal, labelled EN2 in FIG. 2. The PROM 40 will be discussed hereinafter in more detail.

Throughout the Drawing, it will be noted that each of the functional blocks containing logical circuitry requiring voltage supplies have been provided with a power supply terminal, generally designated as Vs, and a reference or ground terminal, designated as REF. It will be understood throughout the specification that this terminology is intended to imply that each of the logical circuits requiring energization by a power source is appropriately connected to power supplies (not illustrated).

The three-bit binary encoded signal produced at the output terminals of the three-bit latch 306 is transmitted by means of the signal flow path 14 to the input terminals of a one-of-eight decoder circuit 202 within the variation select functional block 20. The one-of-eight decoder 202 has a plurality of output terminals 202a–202h, and is operable to decode the encoded three-bit binary signal received at its input terminals and to provide a logical high output signal at that one of its eight output terminals which is uniquely identified by the received binary code. The variation select functional block includes a plurality of manually settable switches designated as A'-H' in FIG. 2. Each of the switch members A'-H' is associated with a different respective one of the laundry machine cycle or programs selectable by the respective input select switching members A-H of the cycle select functional block 10. Each of the output terminals 202a–202h of the one-of-eight decoder 202 is respectively connected to the common movable terminal of the respective one of the manual switches A'-H'. Each of the manual switches A'-H' has five selectable switching positions, as illustrated in FIG. 2. Each of the selectable switching positions is associated with the unique one of five variations of that laundry machine cycle selected by means of the cycle select functional block 10. The five selectable switching positions of the switches A'-H' are designated respectively in FIG. 2 as s1–s5. The corresponding designated terminals of each of the switches A'-H' are commonly connected to one another, and are provided as signal outputs from the variation select functional block 20 as follows: the s5 terminals are commonly connected by means of the conductor 14.1; the s2 terminals are commonly connected by means of the conductor 14.2; the s3 terminals are commonly connected by means of the conductor 14.3; and the s4 terminals are commonly connected by means of the conductor 14.4.

Each of the conductors 14.1–14.4 is connected to provide an input to an OR gate 314 within the address select functional block 30. The signal output from the OR gate 314 is transmitted by means of an invertor 316 to a first signal input 318a of an AND gate 318. The AND gate 318 further has a second signal input terminal 318b and a signal output which is directly connected to a first input terminal 320a of an OR gate 320. The OR gate 320 further has second through sixth input terminals 320b–320f respectively and a signal output terminal 320g.

The conductor 14.1 also provides an input signal directly to a first signal input 322a of an AND gate 322. The AND gate 322 further has a second signal input 322b and a signal output terminal directly connected to the fifth input terminal 320e of the OR gate 320.

The conductor 14.4 is connected to provide an input signal to a first input terminal 324a of an AND gate 324. The AND gate 324 further has a second input terminal 324b, and a signal output terminal which is directly connected to the fourth input terminal 320d of the OR gate 320.

The conductor 14.3 is connected to provide an input signal to a first input terminal 326a of an AND gate 326. The AND gate 326 further has a second signal input terminal 326b, and a signal output terminal which is directly connected to a third input terminal 320c of the OR gate 320.

The conductor 14.2 is connected to provide a signal input to a first input terminal 328a of an AND gate 328. The AND gate 328 further has a second signal input terminal 328b, and an output terminal which is directly connected to the second input terminal 320b of the OR gate 320.

The "master enable" signal from the one-bit latch 310 is provided by means of the signal flow path 28 to an enable input terminal (EN) of a one-of-eight decoder network 330. The one-of-eight decoder 330 further has three input terminals 330i1–330i3 suitable for receiving a three-bit encoded binary signal, and eight output terminals 330a–330h. The decoder 330 operates in a manner similar to that previously described with respect to the decoder 202. The output terminal 330a of the decoder 330 is directly connected to the second input terminal 312b of the OR gate 312. The output terminal 330b of the decoder 330 is directly connected to the second input terminal 318b of the AND gate 318, and is associated with the "fifth variation" of the laundry cycles or programs. The signal output 330c of the decoder 330 is connected to the second input terminal 328b of the AND gate 328 and is associated with the "first variation" of the laundry cycles or programs. The signal output 330d of the decoder 330 is directly connected to the second input terminal 326b of the AND gate 326 and is associated with the "second variation" of the laundry cycles or programs. The signal output 330e of the decoder 330 is directly connected to the second input terminal 324b of the AND gate 324 and is associated with the "third variation" of the laundry cycles or programs. The signal output 330f of the decoder 330 is directly connected to the second signal input terminal 322b of the AND gate 322 and is associated with the "fourth variation" of the laundry cycles or programs. The signal output 330g of the decoder 330 is directly connected to the sixth input terminal 320f of the OR gate 320. The signal output terminal 330h of the decoder 330, is in the preferred embodiment, connected to alarm indicators (not illustrated).

The output terminal 320g of the OR gate 320 is directly connected to the first input terminal 332a of an AND gate 332. The AND gate 332 further has a second input terminal 332b directly connected to the "master enable" signal flow path 28, and a signal output terminal which is directly connected to the second "enable" input terminal EN2 by means of the conductor 28.2. The signal output from the output terminal 320g of the OR gate 320 is transmitted by means of an invertor 334 and a first conductor 24.1 of the signal flow path 24, to the timing and control circuits 60.

The address select functional block 30 further has a six-bit binary counter 336, having a toggle input terminal TGL connected to receive input pulses from the timing and control network 60 by means of a conductor 24.2. The six-bit counter 336 further has six output terminals 336a–336f for providing a six-bit binary encoded addressing signal to the PROM 40, as hereinafter described. The three-bit encoded binary signal from the output terminals of the three-bit latch 306 is applied by means of the signal flow path conductors 16.1–16.3 of the signal flow path 16 to three upper address input ports 40A1–40A3 respectively. The six-bit binary encoded signal provided at the output terminals 336a–336f of the six-bit binary counter 336 is applied by means of the conductors 16.4–16.9 of the signal flow path 16 to fourth through ninth lower address ports 40A4–40A9 respectively of the PROM 40. The address input ports 40A1–40A9 of the PROM 40 receive the addressing signals from the address select circuits 30 for selectively reading individual words from the memory banks contained within the PROM functional block 40. As indicated previously, the PROM 40 comprises in the preferred embodiment a pair of 4096-bit programmable read-only memories organized as 512 words of eight bits per word, each providing an eight-bit output. The two PROM memories are addressed in parallel to provide a 16-bit output. Typical of such memories is the HM-7640/7641 memory manufactured by Harris Semiconductor. In the preferred embodiment, each of the standard 4096-bit PROM memories within the memory functional block 40, includes address buffers, a row decoder, a memory erase and column decoders. In the preferred embodiment, the PROM memory is functionally divided into eight addressable 64-byte blocks of memory, each of such blocks being associated with a separate one of the laundry machine cycles or programs selectable by one of the eight switching elements A–H of the cycle select functional block 10. The three-bit signal applied to the upper address ports 40A1–40A3 of the PROM 40 selects one of the eight unique blocks of memory, as hereinafter described in more detail. The six-bit encoded binary signal applied to the lower address ports 40A4–40A9 of the PROM 40 selects that individual one of the 64-bytes within the selected memory storage block which is to be read. The six-bit binary counter 336 operates in a manner well-known in the art, to sequentially provide an increasing binary count at its output terminals 336a–336f in response to receipt of toggle pulses at its toggle TGL input terminal, the output binary count being incremented one binary count for each received input toggle pulse. The six-bit binary counter 336 is reset upon receipt of a reset input pulse at its reset input terminal (R). This reset signal is provided from the master enable line 28.1 which is transmitted through an invertor 338 to the reset (R) input terminal of the counter 336.

The PROM 40 further has 16 output ports, labelled for convenience in identifying their respective control functions. Three output ports of the PROM 40, labelled as V1–V3 are directly connected by means of three conductors 16.10–16.12 respectively of the signal flow path 16, to the input terminals 330i1–330i3 respectively of the one-of-eight decoder 330. The output terminals V1–V3 of the PROM 40 provide a three-bit binary encoded signal representation corresponding to the variation identifier assigned to the particular memory instruction being read. This three-bit binary signal is compared by the address select circuits 30 with the variation code signal received from the variation select circuits 20, as will be hereinafter described in more detail.

The PROM 40 has four output ports identified as T1–T4 which are connected respectively by means of conductors 22.1–22.4 to circuits within the timing and control network 60, as hereinafter described. The T1–T4 output ports of the PROM 40 carry a four-bit binary encoded signal which control the timing duration of the respective sequential steps or stages of the laundry machine cycle or program being executed.

The PROM 40 also has nine output function ports labelled O1–O9 which provide output signals for controlling the laundry machine laundering functions through the timing and control circuits 60 and the output decode/control and recycle circuits 50. The signal output applied to the output port O1 of the PROM 40 is employed to control the "extract" step in the laundry machine cycle or program. The signal appearing at output port O2 of the PROM 40 is employed to control a "Drain" function of the laundry cycle or program. The output signals appearing at the O3 and O4 outputs ports of the PROM 40 are employed respectively to control the "hot" and "cold" water fill portions of the laundry cycles or programs. The signal output appearing at the output terminal O5 of the PROM 40 is employed to control the "level" of water within the laundry machine, during various portions of the laundry cycles or programs. The signal outputs appearing at the output ports O6–O9 of the PROM 40 are used to control the injection of detergent and bleach into the laundry container at specified times throughout the respective laundry cycles or programs being performed. The signal output ports O1–O9 of the PROM 40 are respectively connected by a plurality of conductors 18.1–18.9 comprising the signal flow path 18 to circuits within the output decode/control and recycle functional block 50, as hereinafter described.

The output decode/control and recycle circuits are schematically illustrated in more detail in FIG. 4. Referring thereto, the conductor 18.2 is directly connected to a first signal input terminal 502a of an AND gate 502. The AND gate 502 further has a second signal input 502b and a signal output terminal which is directly connected to the gate input terminal (G) of a solid state relay or triac 504. The triac 504 further has a power input terminal (P) and a signal output terminal which is directly connected to energize a Drain motor 506. The Drain motor 506 is connected (not illustrated) to control the Drain of the laundry tub of the laundering machine whose laundering functions are being controlled by the controller apparatus of this invention.

The conductor 18.3 is connected to provide a signal input to a first input terminal 508a of an AND gate 508. The AND gate 508 further has a second signal input terminal 508b and a signal output terminal 508c which is directly connected to a gate (G) input terminal of a triac 510. The triac 510 further has a power input terminal (P) and a signal output terminal which is directly connected to energize a solenoid valve 512 for controlling the injection of "hot" water into the laundering tub of the laundering machine.

The signal output terminal 508c of the AND gate 508 is also directly connected to a first input terminal 514a of an OR gate 514. The OR gate 514 further has a second input terminal 514b and a signal output terminal which provides a signal output by means of an invertor 516 to a conductor 26.1 of the signal flow path 26.

A signal input is applied by means of the conductor 18.4 to a first input terminal 518a of an AND gate 518. The AND gate 518 further has a second signal input terminal 518b which is directly connected to the second signal input 508b of the AND gate 508, and a signal output terminal 518c which is directly connected to provide a signal input to an input gate terminal (G) of a triac 520. The triac 520 further has a power input terminal (P) and a signal output terminal which is directly connected for controlling energization of a solenoid valve 522. The solenoid valve 522 is connected to control the injection of "cold" water into the laundry tub of the laundry machine. The signal output terminal 518c of the AND gate 518 is also directly connected to the second signal input terminal 514b of the OR gate 514.

An input signal is provided by means of the conductor 18.5 to a first input terminal 524a of an AND gate 524. The AND gate 524 further has a second input terminal 524b and a signal output terminal 524c which is directly connected to provide a signal input to an input terminal 526a of an OR gate 526. The OR gate 526 further has a second input terminal 526b and a signal output terminal 526c.

A "low-level pressure switch" 528 is connected to provide a signal input to the second input terminal 524b of the AND gate 524. The low-level pressure switch 528 is mounted within the laundering machine so as to provide a signal output whenever the liquid level within the laundry tub has reached a first predetermined "low-level" height.

The signal carried by the conductor 18.5 is also applied by means of an invertor 530 to a first input terminal 532a of an AND gate 532. The AND gate 532 further has a second signal input terminal 532b and a signal output terminal 532c which is directly connected to provide input signals to the second input terminal 526b of the OR gate 526. Output signals from the OR gate 526, which are provided at the output terminal 526c are transmitted by means of the invertor 534 to the second input terminals 508b and 518b respectively of the AND gates 508 and 518.

A "high-level pressure switch" 536 is connected to provide a signal input to the second input terminal 532b of the AND gate 532. The high-level pressure switch 536 is mounted within the laundry machine so as to provide a signal output whenever the liquid level within the laundry tub has attained a second predetermined "high-level" height, which exceeds the "low-level" height or depth of liquid within the tub, which is measured by the low-level pressure switch 528.

The signals carried by the conductors 18.6–18.9 are applied to circuits within an additive injection control functional block 540. The additive injection control circuits 540, are not illustrated in detail in the Drawing, but may comprise any appropriate circuitry for controlling the injection of such additives as bleach, fabric softener, detergents, and the like into the laundry tub at various steps in the laundry cycles or programs - all under control of commands received from the PROM 40 through the input conductors 18.6–18.9. The additive injection control circuits 540 are generally illustrated as having a power input terminal (P), and as being referenced to ground potential, for enabling activation of any solenoid valve or triac controlled motors required to perform the respective additive injection functions, all performed in a manner similar to that described with respect to the other specifically described output control functions.

Signals carried by the conductor 18.1 are applied directly to a first signal input 544a of an AND gate 544. The AND gate 544 further has a second signal input 544b and a signal output 544c. The conductor 18.1 also directly applied signal commands from the memory to a first signal input terminal 546a of an AND gate 546. The AND gate 546 further has second and third signal inputs 546b and 546c respectively and a signal output terminal 546d.

The second signal input terminal 546b of the AND gate 546 is directly connected to the second signal input terminal 502b of the AND gate 502. An "out-of-balance switching member" 548 is directly connected to provide an output signal to the third input terminal 546c of the AND gate 546. The balance switch 548 is mounted within the laundry machine so as to provide a signal output whenever the load within the laundry tub is disproportionately positioned therein so as to cause an "unbalanced" condition upon rotation of the laundry tub, in an extract spin attempt.

The signal output terminal 546d of the AND gate 546 is directly connected to a first signal input terminal 550a of an AND gate 550. The AND gate 550 further has a second input terminal 550b and a signal output terminal 550c. The output terminal 550c is directly connected to a first input terminal 552a of an AND gate 552. The AND gate 552 further has a second input terminal 552b and a signal output terminal 552c. An "empty tub sensor" 554 is connected to provide a signal output to the second input terminal 552b of the AND gate 552. The empty tub sensor 554 is mounted within the laundry machine so as to sense the presence of liquid within the laundry tub and to provide a logical high output signal to the AND gate 552 only when the laundry tub does not contain any appreciable volume of liquid.

The signal output terminal 552c of the AND gate 552 is directly connected to the gate input terminal (G) of a triac 556. The triac 556 further has a power input terminal (P) and a signal output connected by means of a contactor 558 to control energization of "fast spin" windings of the motor (not illustrated) that is connected to rotate the laundry tub of the laundry machine.

The signal output terminal 552c of the AND gate 552 also provides control signals by means of an inverter 560 to the gate input terminal (G) of a triac 562. The triac 562 further has a power input terminal (P) and a signal output terminal which is connected by means of contactor 564 to control energization of the "slow-spin" windings of the laundry machine motor (not illustrated). The slow-spin motor windings are connected to rotate the laundry tub of the laundry machine in a relatively slow rotational manner, often referred to as a "tumble" motion in the laundering art. The AND gate 552 also provides signal input by means of the inverter 560 to the second input terminal 544b of the AND gate 544.

The AND gate 550 provides signal flow by means of an inverter 566 to a first signal input terminal 568a of an AND gate 568. The AND gate 568 further has a second signal input terminal 568b and an output terminal 568c which is directly connected to a signal input of a combined divide-by-eight counter having a one-of-eight output, labeled as 570.

The counter 570 operates as an "output dividing" counter, to provide an output pulse at sequential ones of its output terminals in response to the receipt of clock input pulses applied to its input terminal from the AND gate 568. The counter 570 has eight output terminals labeled 570a–570h respectively. The outputs "counts" of the counter 570 sequentially appear at the signal output terminals 570a–570h, in consecutive cyclic order. The first and fifth output terminals 570a and 570e respectively are not connected to other circuitry. The second, third, and fourth output terminals 570b–570d respectively of the counter 570 are connected by means of an OR gate 572 to the gate input terminal (G) of a triac 574. The triac 574 further has a power input terminal (P) and a signal output terminal which is connected by a contactor 576 to energize the "forward" windings of the laundry tub rotating motor (not illustrated). When energized the "forward" windings rotate the laundry tub in a "forward" or first rotational direction about its axis.

The sixth, seventh, and eight output terminals 570f–570h respectively of the counter 570 are connected by means of an OR gate 578 to the gate input terminal (G) of a triac 580. The triac 580 further has a power input terminal (P) and a signal output terminal which is connected by a contactor 582 to energize the "reverse" windings of the laundry tub rotating motor (not illustrated). When energized, the reverse windings cause rotation of the laundry tub in a "background" or "reverse" direction about its rotational axis, which direction is opposite to that of the previously mentioned "forward" direction. The second output terminal 570b of the counter 570 is also connected in a feedback manner to supply an input signal to the second input terminal 550b of the AND gate 550.

A divide-by-five counter 584 has an input terminal connected to a conductor 26.2 of the signal flow path 26, for receiving a 1Hz input signal from the timing and control circuits, to be described in more detail later herein. The divide-by-five counter further has an enable input terminal (EN) and a signal output terminal which is directly connected to the second input terminal 568b of the AND gate 568.

The AND gate 544 provides signal flow to a conductor 26.3 of the signal flow path 26 by means of an inverter 586.

Those portions of the output decode/control and recycle functional block 50 previously described provide the basic output control functions for the physical laundering apparatus to be controlled in the laundry machine. Those circuits to be next described, and illustrated near the top portion of FIG. 4 control the interruption, stopping and recycling of the laundry cycles of programs executed by the controller apparatus.

Execution of a program can be stopped at any time during the program by closing an emergency stop switch 585. In the preferred embodiment, the emergency stop switch 585 is a normally open push-button switch, having a first stationary terminal connected to an appropriate voltage source Vs and having a second stationary contact connected to the input terminal of a one-bit latch 586. The latch 586 further has a reset input terminal (R) directly connected to receive signals from the conductor 17.1, and a signal output terminal directly connected to a first signal input 587a of an AND gate 587. The AND gate 587 further has a second input terminal 587b and a signal output terminal 587c. The second input terminal 587b of the AND gate is directly energized by the conductor 28.1.

The signal output terminal 587c of the AND gate 587 is connected by means of an invertor 588 to the conductor 17.3 for providing a disable signal back to the formula select gates 302 of the address select circuits 30, and is also connected by means of a relay driver circuit 589 to control energization of the coil 590a of a main power relay 590. The relay 590 further has a novable contact member 590b and a pair of stationary contacts 590c1 and 590c2. The relay 590 is normally operable to provide open contact between the stationary contacts 590c1 and c2 when the relay coil 590a is not energized, and is operable to close the circuit between the stationary contacts c1 and c2 whenever the relay coil 590a is energized. The first stationary contact 590c1 is directly connected to an AC power source, and the second stationary contact 590c2 is directly connected to energize the output function circuits within the output decode/control and recycle functional block 50. In particular, the stationary contact 590c2 of the relay 590 is connected to the power input terminals (P) of the triacs 510, 520, 574, 580, 556, 562 and 504, and is also connected to the power input terminal (P) of the additive injection control function block 540.

The signal output from the one-bit latch 586 is also directly applied by means of an invertor 591 to the second signal input terminals 546b and 502b of the AND gates 546 and 502 respectively. The signal output from the 1-bit latch 586 is also directly applied to a first signal input terminal 592a of an AND gate 592. The AND gate 592 further has a second signal input terminal 592b and a signal output terminal 592c which is directly connected to a first input terminal 593a of an OR gate 593. The OR gate 593 further has a second signal input terminal 593b and a signal output terminal 593c which is connected by means of a signal delay member 594 to control a door lock member (not illustrated).

Initiation of an emergency stop results in an immediate discontinuance of execution of that program currently in progress, and enable opening of a door lock on the laundry machine door (not illustrated) to allow sufficient time for the laundry tub rotation to arrest.

A program can be recycled by activation of a recycle switching member 595 which, in the preferred embodiment, is a normally open push-button switching member. A first stationary contact of the recycle switch 595 is directly connected to an appropriate voltage source (Vs), and the second stationary contact of the switch 595 is directly connected to a signal input of a one-bit latch 596. The latch 596 further has a reset input terminal (R) directly connected to receive the master enable signal from the conductor 28.1, and a signal output terminal which is directly connected to the second signal input terminal 593b of the OR gate 593. The second input terminal 592b of the AND gate 592 is directly connected to the conductor 18.1. The master enable signal is also carried by means of the conductor 28.1 to the enable (EN) input terminal of the divide-by-five counter 584.

An initiation of a recycle, by closing of the recycle switch 595 effects an discontinuance in execution of the current program and resets the controller for re-initiation either of that of the previously executed or any one of the other programs or cycles.

The signal input received by the output decode/control and recycle network 50 by means of the conductor 18.1 is also redirected to a conductor 26.4 of the signal flow path 26 (as indicated by the square designation at the junction of the two signal flow paths, to the timing and control network 60. The timing and control circuits are illustrated in detail in FIG. 3. Referring thereto, a 60-Hz signal, derrived from any appropriate AC power source (not illustrated), is applied to a timing input port 600 of the timing and control network 60. The 60-Hz signal is carried from the timing input port 600 by means of a conductor 601 to an input terminal of a divide-by-60 counter 602 and is also appled by means of the conductor to an input terminal of a divide-by-two counter 604. The divide-by-60 and divide-by-two counters 602 and 604 respectively further each has an enable input terminal (EN) which is directly connected to receive the master enable signal from the conductor 28.1. The divide-by-60 counter further has a first output terminal 602a directly connected to the conductor 26.2 and a second output terminal 602b connected to the movable contact 606a of a manual switch 606. The divide-by-60 counter is operable to provide a 1-Hz output signal at its respective output terminals in response to the received 60-Hz input signal.

The manual switch 606 further has a pair of stationary contacts 606c1 and 606c2. The first stationary contact 606c1 of the switch 606 is directly connected to a first input terminal 608a of an AND gate 608. The AND gate 608 further has second and third input terminals 608b and 608c respectively and a signal output terminal 608d. The second signal input terminal 608b of the AND gate 608 is directly connected to receive signals from the conductor 26.1, and the third signal input terminal 608c of the AND gate 608 is directly connected to receive input signals from the conductor 26.3.

The second stationary contact 606c2 of the switch 606 is directly connected to first input terminals 609a and 610a of a pair of AND gates 609 and 610 respectively. The AND gate 609 further has a second input terminal 609b and signal output 609c which is directly connected to the first input terminal 608a of the AND gate 608. The AND gate 610 further has a second input terminal 610b and a signal output terminal 610c. The conductor 26.4 is directly connected to provide a signal input to the input terminal 610b of the AND gate 610, and provides inputs signals by means of an inverter 611 to the second input terminal 609b of the AND gate 609.

The signal output terminal 610c of the AND gate 610 is connected to provide signal input to a divide-by-two counter 612. The divide-by-two counter further has a signal output which is directly connected to the first input terminal 608a of the AND gate 608.

The manual switch 606 is intended for location on the washing machine proper at a position which is normally inaccessible to an operator of the machine, and is intended for activation only by a serviceman or factory representative. The switch 606 provides an option for extending or shortening the duration of an "extract" or rapid spin portion of the laundry cycles or programs. When the movable contact 606a of the switch 606 is positioned to engage contact 606c1 (as illustrated), the extract spin portion of a program will be significantly shorter than when the movable contact 606a is positioned so as to engage the second contact 606c2.

The 1-Hz signal transmitted through the AND gate 608 is directly applied to the toggle (TGL) input terminals respectively of a divide-by-five counter 614 and a divide-by-30 counter 616. Each of the counters 614 and 616 has a first enable input terminal (EN1) which is directly connected to receive the master enable signal from the conductor 28.1. The counters 614 and 616 also each have a second enable input terminal labeled (EN2), whereby the counters 614 and 616 require enabling input signals at both of their respective enable input terminals (i.e. at both EN1 and EN2) before they become operable to provided divide output counts. The "drain control" signal from the PROM 40 as applied to the conductor 18.2, is applied directly to the second enable input terminal (EN2) of the divide-by-30 counter 616, and is applied by means of an inverter 618 to the second enable input terminal (EN2) of the divide-by-five counter 614.

The output signals of the divide-by-five counter 614 and of the divide-by-30 counter 616 are applied by means of an OR gate 622 to the toggle input terminal TGL of a presettable down counter 628. The presettable down counter 628 further has four "set" input terminals S1–S4, a reset input terminal R and a signal output terminal 628c. The "set" input terminals S1–S4 of the counter 628 are directly connected to receive a four-bit binary encoded signal from the T1–T4 output terminals of the PROM 40 by means of the conductors 22.1–22.4 respectively. The "presettable count" is set into the counter 628 from the PROM 40 through the "set" input terminals S1–S4. The counter 628 then operates in a manner well known in the art, to count down in binary, responsive to input pulses received at its toggle TGL input terminal, until the "preset" count is reduced to zero, at which time the counter 628 provides an output pulse at its signal output terminal 628c. As will become apparent upon a more detailed description of the operation of the preferred embodiment, the actual length of time required to execute any given count which is preset into the counter 628 will vary in response to the rapidity of input toggle pulses received from the logically preceeding counters within the timing and control circuits 60. In other words, the timing increment between successive toggle pulses received by the down counter 628 is a function of the signal output of those various counters within the timing and control circuits 60 which are enabled, according to the PROM 40 control which corresponds to that particular step in the laundry machine cycle or program which is currently being executed by the controller.

The signal output terminal 628c of the down counter 628 is directly applied to a first input terminal 632a of an OR gate 632. The OR gate 632 further has a second signal input terminal 632b, and provides an output signal which is transmitted to the address select circuits 30 by means of the conductor 24.2. The signal output from the OR gate 632 is also applied by means of a one-shot multivibrator 640 to the reset input terminal (R) of the presettable down counter 628, which resets the counter 628.

The signal output from the divide-by-two counter 604 is directly applied to a signal input terminal 636a of an AND gate 636. The AND gate 636 further has a second signal input terminal 636b which is directly connected to receive input signals from the address select circuits 30 by means of the conductor 24.1. The logical output signal from the AND gate 636 is directly applied to the second input terminal 632b of the OR gate 632.

As will become apparent upon a more detailed description of the operation of the preferred embodiment, the output signal from the OR gate 632 toggles the 6-bit binary counter 336 of the address select circuits 30 to increment the count of the counter 336, which effects a "read" operation of the next addressable memory location within the PROM 40. As will be described in more detail hereinafter, pulses by conductor 24.1 through the AND gate 636 will cause the six-bit binary binary counter 336 to advance its count (thereby sequencing addressing of successive memory locations within a 64-byte of selected memory storage of the PROM 40), at a relatively rapid rate when there is no coincidence between the "variation indicating" binary code carried by conductors 14.1-14.4 and the output "variation indicating" binary code of the currently addressed memory location, provided at the variation output terminals V1-V3 of the PROM 40.

OPERATION OF THE PREFERRED EMBODIMENT

The electronic laundry machine controller of this invention provides a sophisticated, automated, yet simple to operate electronic system for controlling the sequential laundering operations of a laundry machine. An operator of the machine initiates execution of one of a plurality of unique laundry cycles or programs by pushing a single button (i.e. by closing a single electronic switch) on the cycle select input switching block 10. From that single input stimulus, the controller automatically synthesizes that unique sequence of laundry steps comprising the selected laundry cycle or program, by providing in timed sequence, under hardwire or firmware control of the PROM 40, a plurality of electronic commands to the output function controls of the laundry machine, to effect a logical execution of the selected laundry cycle or program. The entire set of program steps required to synthesize any selected cycle or program are preprogrammed into the PROM 40 and are transmitted under hardwire control to the various circuits throughout the controller. Similarly, the timing and control circuits 50 are operable to control the sequential addressing of the PROM 40, to synthesize the laundry cycle of program being executed and to define the timed duration of the output function laundry cycle commands comprising the selected laundry cycle or program, all in response to instructions received from the PROM 40. It will be understood that the invention is directed to the concept of automatically electronically synthesizing complete laundry cycles or programs under electronic memory or firmware control, all in response to a single input command by an operator. While the preferred embodiment of the invention employs a dedicated programmable read only memory having identifiable blocks of memory instructions which are sequentially addressed to synthesize the selected cycle or program, it will be understood that the principles of this invention apply equally well to other similar implementation techniques, such as to the use of a dedicated microprocessor controlled system which would synthesize unique programs under firmware control of a central processor unit by providing in timed sequence, laundry control commands from a general compilation of fixed memory instructions in response to firmware selection commands preprogrammed into the microprocessor.

In the preferred embodiment, the memory storage banks of the PROM 40 are operatively subdivided into a plurality of unique "blocks" of memory, each such block of memory being identifiably associated with and uniquely addressable by associated ones of the input selection switches (A-H of the cycle select functional block 10. Activation of one of the input selection switches A-H causes the address select circuits 30 to selectively address only those memory instructions within the associated "block" of memory within the PROM 40. In the preferred embodiment, there are eight such "blocks" of memory, corresponding to the eight input selection switches A-H, which are selectively addressed by means of the three upper bits of the nine-bit input address of the PROM 40, represented by the three address input ports A1-A3 of PROM 40. For ease of description, it will be assumed that there are no "physical" overlap of instructions among the eight unique functional "blocks" of memory, however, it will be appreciated that a system could be configured in which certain laundry program steps or instructions within a cycle or program could occupy the same physical locations within the memory banks, in which case the physical instruction addresses of two or more of the functional blocks of memory would overlap one another. Similar results could be obtained using "jump" instructions to "shared" subroutines in a microprocessor firmware controlled apparatus.

In the preferred embodiment of the invention, each of the functional "blocks" of memory comprises 64 bytes or instructions, with each byte comprising 16 binary bits of output function and timing control information, to be hereinafter decsribed in more detail. Each of the memory blocks is identifiable with a unique type or class of laundrying programs. For example, that block of memory instructions associated with input selection "A" may represent "heavy laundry" programs, that block of instructions associated with input selection "B" may represent "permanent press" programs, etc. The 64 bytes or instructions within each block of memory are preprogrammed, in the preferred embodiment, so as to comprise five different unique "variations" of the particular type or class of laundry programs represented by that particular block of memory. For instance, in the above example, if that block of memory associated with selection "A" represents the class or type of laundry program generally classified as "heavy laundry," the five program variations would represent five different combinations of the 64 bytes within that memory block, such that each of the instruction combinations when sequentially executed, provides one of five different variations of the basic "heavy laundry" program. In practise of the invention, the respective variations of each basic program can be altered such that at least one of the five program variations for each of the basic laundry program selections A-H will satisfy the special laundering conditions of the intended users of the laundry machine. For example, one "heavy laundry" program variation may comprise a laundry program specifically designed for laundering bedspreads for hotel/motel applications, a second variation of the "heavy laundry" class of programs could be specifically design for laundering tablecloths and napkins for restaurant applications, etc. It will be readily apparent that with five different variations of each of the eight basic programs, the preferred embodiment offers forty uniquely distinct laundering programs. It will also be apparent that the total number of possible laundering programs which can be provided by a controller constructed according to the principles of this invention can vary to any number, by changing either or both of the number of basic memory storage "blocks" and the number of possible program "variation" attainable by forming different combinations of instructions from those instructions within the respective memory "blocks."

In the preferred embodiment of the invention, the variation select switching members 20 enable only one of the five possible predetermined program variations to be executed for each of the eight respective functional blocks of memory. In practise, that particular "variation" of each basic type or class of laundering programs, which best satisfies the peculiar needs of the individual launder machine user, is preselected (by means of the variation select switches A'–H') either at the factory prior to shipment of the laundry machine to the customer, or by the serviceman at the installation site of the laundry machine. As will become apparent upon a more detailed description of the operation of the preferred embodiment, the variation output signal from the variation select switches 20 enables execution of only those instructions within a selected "block" of memory which correspond with the encoded signal from the variation select switches 20.

From the foregoing brief description of operation of the electronic controller, it will be appreciated that synthesis of the respective laundry programs from instructions hardwired into programmable read only memory banks, offers extreme increased flexibility in both the format and the number of different laundry cycles or programs that can be offered by a single, compact, efficient and highly reliable electronic controller of the present invention. Such flexibility, reliability and efficiency in program selection were not heretofore possible with the electromechanical or electrical configurations of prior art laundry controller systems. The present invention will be more clearly understood from the following description of operation of the apparatus through its execution of a particular laundry cycle.

Referring to the figures, by way of example, the controller operation will be described by selecting execution of that program or laundry machine cycle corresponding to selection of input switch "E" of the cycle select input switches 10, with the variation select switch E' preset to "variation 1," corresponding to that situation wherein the movable switch arm of variation switch E' is in electrical contact with the stationary contact S2 (see FIG. 2). For convenience in identification, this laundry machine cycle will hereinafter be referred to as cycle or program "E." The functional output control steps involved in execution of laundry machine cycle E1 are generally sequentially listed in Table 1. Referring to Table 1, the left-hand column entitled "Laundry Steps or Operations" refers to the typical common name identifiers used in the industry to refer to those particular operations or steps which are sequentially being performed throughout the execution of the laundry cycle or program. In the execution of the laundry machine program E1, the identified laundering operations are sequentially executed (from top to bottom in Table 1) for those corresponding durations indicated in column 2 ("Step Duration") of Table 1. The third column labeled "Water Temp" indicates whether "hot" or "cold" water is to be added to the laundry tub during the corresponding laundry step or operation. The fourth column labeled "Water Level" indicates the desired liquid level within the laundry tub during the corresponding laundry operation. The fifth column labeled "Additives" indicates whether any detergent, bleach, softener or other additives are to be injected into the laundry tub during the corresponding laundry step or operation.

As previously indicated, execution of the individual operations or steps of a selected laundry cycle or program are controlled by means of binary instructions read from the addressed "block" or selected memory of the PROM 40. The 16-bit instruction which is currently being read from the PROM 40 collectively appears at the 16 output terminals: O1–O9, T1–T4 and V1–V3. To facilitate the following discussion of operation of the present invention in executing the laundry machine cycle E1, a truth table listing the 16-bit binary output instructions of the first thirty-nine of the 64 bytes or instructions within that "block" of PROM 40 storage which correspond to laundry machine cycle "E," is presented in Table 2.

Referring to the truth table output listed in Table 2, it will be noted that only those relative address locations required to fully explain execution of laundry machine cycle E1 have been listed. It will be understood the entire "block" of memory locations associated with the type or class of laundry programs associated with the input selector "E" comprises 64 such bytes or instructions. It will be understood that Table 2 represents the binary "output" signals stored at specific memory locations within the PROM 40 and that Table 2 does not reflect the nine-bit "input" addresses of the respective memory locations, which will be hereinafter described. With respect to the encoded representations in Table 2, which represent various multi-output parameters, while such parameters are encoded in a binary numeration system in the preferred embodiment of the present invention, it will be understood that any appropriate encoding scheme can equally well be employed within the spirit and intent of this invention.

Referring to Table 2, the following definitions apply with respect to the various headings identified therein:

"Relative Address" simply represents a decimal number of the successive address locations within that block of memory storage locations within the PROM 40, which correspond to the input selector cycle switch "E."

The three output signals broadly identified under the "Variation" columns represent those output signals which appear at the V1–V3 output ports of the PROM 40. These three signals identify, in binary code, the particular program or cycle "variation" to which the instruction stored at the particular relative memory address location corresponds. In the preferred embodiment of the present invention, the V1 output port represents the least significant bit of the three-bit number and the V3 output port represents the most significant bit of the three-bit binary number (e.g. the binary representation V1 V2 V3 = 011 corresponds to the binary representation of the decimal number 6). The three "variation" identifier signals provide an indication of whether the remaining thirteen output commands of that particular addressed instruction should be executed as a step or operation of the preset variation of the selected laundry cycle or program. The "variation" output signals from the PROM 40 are directly applied to the input ports of the one-of-eight decoder 330 (see FIG. 2) for comparison with the preselected variations derived from the variation select switches 20.

The four columns of output signals indicated as the general heading "Time" correspond to the signal output ports T1–T4 of the PROM 40, and are directly applied as input signals to the presettable down counter 628 (see FIG. 3). These four "time" signals represent a binary encoded representation of a time duration to which the presettable down counter 628 is to count, wherein T1 represents the least significant bit of the "time" representation, and T4 represents the most significant bit of the 4-bit binary encoded "time" number.

The nine binary output signals identified under the general heading "Output Function Ports" correspond to the signal output ports O1–O9 of the PROM 40. The O1 output signal controls operation of the "spin" speed of the laundry tub, wherein a logical "0" corresponds to a slow spin speed and wherein a logical "1" corresponds to a fast or "extract" spin speed. The O2 output signal controls operation of the drain motor 506 (see FIG. 4), wherein a logical "1" corresponds to a closed drain condition, while a logical "0" corresponds to an open drain condition. The O3 and O4 output signals respectively control operation of the "hot" and "cold" water line control solenoids 512 and 522 respectively, wherein a logical "1" signal in either of these columns corresponds to energization of the respective solenoids so as to open the respectively controlled water lines, to add water of the respective temperatures into the laundry tub. The O5 output signal controls operation of the liquid level sensing circuitry represented by the low and high level pressure sensing switches 528 and 536 respectively, the AND gates 524 and 532, the inventer 530 and the OR gate 526 (see FIG. 4). A logical "1" at the O5 output ports sets the liquid level sensing circuits for deactivating the "hot" and "cold" solenoid valves 512 and 522 respectively when the water level within the laundry tub has attained the lower first predetermined liquid level. When a logical "0" output signal appears at output port O5, the "hot" and "cold" solenoid valves 512 and 522 are de-energized, thus arresting water flow through the respectively controlled fluid flow paths, whenever the liquid level within the laundry tub has attained a second "higher" predetermined level. The O6–O9 output signals control operation of the additive injection control circuits 540 (FIG. 4) for injecting detergent, bleach, neutralizer or softener into the laundry tub during the laundry machine cycle. In the preferred embodiment, the S1 and S2 controlled circuits are enabled at a logical "0" level and S3 and S4 controlled circuits are enabled at a logical "1" level. In the preferred embodiment of the invention, the S1 and S2 output signals control the injection of detergent into the laundry tub whereas the S3 and S4 output ports respectively control the injection of bleach and neutralizer respectively into the laundry tub.

Operation of the controller circuit is initiated when one of the eight laundry machine cycle select buttons A–H is depressed by and operator, who is making a laundry program selection. Assuming the operator activates the laundry machine cycle select button designated "E," the input select switch E of the cycle select circuit 10 applies a signal along the conductor 12.5 to the formula select gates 302 for encoding. The formula select gates 302 convert the received signal into a three-bit binary encoded representation which is uniquely associated with only the program E selection. Accordingly, the three-bit binary encoded signal appearing at the output terminals of the formula select gates 302 uniquely identifies that basic class or group of laundry programs stored in the PROM 40, which will be activated (i.e. identifies that specific one of the eight "blocks" of memory instructions which contain the required instructions for executing the selected laundry program. The three-bit latch 306 receives the program identifier signal and maintains, until reset, a continuous or latched representation of that signal at its output terminals. The latch 306 also "locks out" the other input selection, to prevent two or more programs from being concurrently executed. The encoded input selection signal also activates the one-bit latch 310 by means of the OR gate 308. The one-bit latch 310 applies a "master enable" signal along the conductor 28.1 to the PROM 40 and also to the various other logical circuits of the controller, including the counters within the timing and control circuits 60 (FIG. 3).

The encoded three-bit binary signal from the three-bit latch 306 is directly applied to the upper three address input ports A1–A3 of the PROM 40, and addresses that one of the eight, sixty-four byte blocks of memory instructions which are identifiably associated with the input selection "E." As previously indicated, the PROM 40 comprises in the preferred embodiment, a pair of memory banks addressed in parallel. Those sixty-four bytes or instructions contained within the selected block of memory locations (indicated by the upper three address bits A1–A3) will be sequentially executed according to the address selection signals received at the six lower address input ports A4–A9 of the PROM 40, as hereinafter described.

Referring to FIG. 2, the three-bit binary signal output from the latch 306 is also applied along the signal flow path 14 to the one-of-eight decoder 202. The decoder 202 is operable to generate a logical "1" or enabling output signal on that one of the output terminals 202a–202h which is identifiably associated with the basic input selection. In the case of our above example, an input selection of the basic E program would result in the application of a logical "1" output signal of the one-of-eight decoder network 202 on its signal output terminal 202e, which would be directly applied to the movable contact arm of the E' variation select switch. Assuming that the movable contact of the E' variation select switch is positioned into engagement with the S2 stationary contact of the E' switch (corresponding to a "variation one" preset condition), an "enable" signal will appear as a logical "high" input signal to the first input terminal 328a of the AND gate 328. It will be noted that due to the one-of-eight decoder 202, only one of the variation select switches A'–H' is activated at a time, and that only one preset "variation" condition is possible at a time for any input selection made by the operator. As will become apparent upon more detailed description herein, the preset condition on the variation select switches 20 determines which of the sixty-four bytes or instructions within the selected "block" of memory will be executed (i.e. only those instructions which will collectively comprise the preset program variation of the basic selected program will be fully executed).

The six-bit binary counter 336 determines the relative address (see Table 2) of that particular instruction or byte within the selected "block" of memory storage which is to be "read" at any given time. The counter 336 performs this addressing function by applying a six-bit binary encoded byte selecting address signal to the lower six address input ports A4–A9 of the PROM 40 by means of the conductors 16.4–16.9. Prior to selection of a laundry program by an operator, the reset R input terminal of the six-bit binary counter 336 is held at a logical "high" reset condition. Following the selection of a laundry program by an operator, the "master enable" signal from the one-bit latch 310 applies, by means of the inverter 338, an enabling signal to the counter 336, which initially applies the binary "0" (i.e. 000000) to its output terminals 336a–336f, addressing that instruction or byte within the selected "block" of memory, which appears at the "zero" relative address position (see Table 2). Accordingly, the relative address "zero" instruction will be read from the PROM 40, which will result in the application to the sixteen output ports of the PROM 40 of those sixteen logical output signals indicated in the first line of Table 2. The relative address "zero" instruction within the selected block of memory will continue to be "read" until the six-bit binary counter 336 advances the input address applied to the six lower address input ports A4–A9 of the PROM 40. This will occur when the counter 336 receives a toggle input signal at its toggle TGL input terminal, from the timing and control circuits by means of the conductor 24.2. Accordingly, the "rate" of advance in "reading" of the instructions or bytes at the sixty-four relative address locations within the selected block of memory, will depend upon the real-time rate at which the six-bit binary counter 336 is toggled.

Since the input toggle signal for driving the six-bit binary counter 336 is derived from the timing and control circuits 60, a brief summary of the operation of the timing and control circuits will be discussed below, with reference to FIG. 3. In general, the timing and control circuits 60 are operable to toggle the six-bit binary counter 336 at a relatively fast "search rate," thus rapidly sequentially reading or advancing through the memory instructions stored at relative addresses 0–63, until the first read memory instruction having a "variation output signal" (provided at output ports V1–V3) which corresponds to the encoded variation signal provided by the variation select circuits 20. For the previous example of selection of the E1 laundry program, this corresponds to rapidly searching through the sixty-four bytes or instructions within the E associated block of memory until the first instruction of the E1 laundry program is found.

Referring to the timing and control circuits 60, the counter circuits 602 and 604 are directly enabled by the "master enable" signal received by means of the conductor 28.1. The divide-by-two counter 604, in combination with the AND gate 636 provide the rapid advance toggle input signals for the six-bit counter 336 whenever that instruction currently being addressed in the PROM 40 does not have a variation code identifier that coincides with the preselected variation of the variation select switches 20. A 60-Hz clock signal is converted by the counter 604 to a 30-Hz input signal to the first input terminal 636a of the AND gate 636. The AND gate 636 will provide a logical high output signal by means of the OR gate 632, to the toggle input terminal of the counter 336 whenever the input signal applied to the second input terminal 636b of the AND gate 636 appears at a logical "high" level. Referring to FIG. 2, it will be noted that the signal output from the OR gate 320 will appear at a logical "low" level, thus providing the required rapid advance logical high signal to the AND gate 636 by means of the invertor 334, whenever all six of the input terminals of the OR gate 320 appear at a logical "low" level. The input signals applied to the OR gate 320 will appear as logical "low" levels only when there is no coincidence between the variation select signal received from the variation select switches 20 and the three-bit binary encoded variation output signal from the PROM 40, which identifies the particular variation of the instruction currently being addressed. Assuming that a condition of non-coincidence between the variation code received from the variation select circuits and the variation code read from the currently addressed instruction, exists the next positive pulse received by the AND gate 636 from the counter 604, will toggle the binary counter 336, thus incrementing by one the relative address applied to the input port terminals A4–A9 of the PROM 40.

From the foregoing description, it will be appreciated that until a condition of coincidence between the variation output code received from the variation select switches 20 and the currently read variation output code from the addressed instruction is attained, the divide-by-two counter 604 will continue to toggle the binary counter 336 for rapidly sequencing through the selected block of memory instructions at a relatively fast 30-Hz rate. When variation code coincidence is attained, as indicated by the application of a logically high signal to any of the input terminals 320a–320e of the OR gate 320, the AND gate 636 will be disabled, causing the binary counter 336 to continue to read that memory instruction location at which variation code coincidence was indicated, until a toggling input signal is received from the presettable down counter 628.

Referring to the timing and control circuits 60 of FIG. 3, the divide-by-sixty counter 602 converts the 60-Hz input signal received at the input port 600 to a 1-Hz clock output signal which is applied to its output terminals 602a and 602b. The manual switch 606 is configured to be located at a position which is inaccessible to an operator of the machine, and is preset either by the service man or at the factory, to provide a longer or shorter fast or "extract" spin, as desired or required by the user's peculiar laundering requirements. When the manual switch 606 is positioned as illustrated in FIG. 3, the extract spin duration is relatively shorter than when the movable contact 606a would be engaged with the stationary contact 606c2. As illustrated in FIG. 3, the 1-Hz output signal from the counter 602 is directly applied to the first signal input terminal 608a of the AND gate 608, to "clock" the counters 614 and 616 through the AND gate 608. The AND gate 608 will be enabled on each 1-Hz clock pulse received from the counter 602 if a number of output function conditions are satisfied, as determined from the feed-back signals from the output circuits 50 received by means of the conductors 26.1 and 26.3. Briefly, the conditions requiring satisfaction prior to enabling of the AND gate 608 are: that hot or cold water are not being currently added to the laundry tub, and that the laundry tub is not in an "extract" or high spin mode of operation. Assuming that the proper "enable" conditions are satisfied for the AND gate 608, the 1-Hz clock pulse received from the counter 602 is applied through the AND gate 608 to the toggle TGL input terminals of the divide-by-five counter 614 and the divide-by-thirty counter 616. The logical input signal appearing on conductor 18.2 determines which of the counters 614 or 616 will be enabled at any one time. When the signal appearing on conductor 18.2 appears at a logical "high" level, the divide-by-thirty counter 616 will be energized; this corresponds to the output condition occurring when the drain of the laundry tub is closed. Conversely, when the signal level appearing on the conductor 18.2 from the PROM 40 appears at a logical "zero," the divide-by-five counter 614 is enabled; this corresponds to the output condition occurring when the laundry tub drain is open. The counter 614, when enabled, generates an output clock pulse every five seconds to the presettable down counter 628. The counter 616, when enabled, generates a clock pulse every thirty seconds to the presettable down counter 628. As previously discussed, the down counter 628 will generate an output clock signal for the six-bit binary addressing counter 336 after the down counter has been toggled through a preset binary count which is received directly from the "time" output terminals T1–T4 of the PROM 40.

The instruction addressing and variation coincidence comparison operation of the preferred embodiment will best be understood by proceeding through a step-by-step execution of several of the instructions for the E1 cycle or program of Tables 1 and 2. Upon initial selection of laundry machine cycle E, which we will assume to have been preset at "variation one," the relative address location "zero" of the block of memory associated with the primary E program is read from the PROM 40. Referring to the truth table of Table 2, it will be noted that the relative address location "zero" has a binary variation code of 0 0 0. This three-bit binary variation code is applied by means of the conductors 16.10–16.12 to the one-of-eight decoder network 330.

Since "variation one" of program E (i.e. E1) has been preset for the E class of laundry programs, only the AND gate 328 of the AND gates 322, 324, 326, 328 and 318 receives a logical "high" signal from the variation select switches 20. Accordingly, the OR gate 320 can only receive a logical "high" signal from the AND gate 328 (and also from the reset output terminal 330g of the decoder 330 as hereinafter described). The AND gate 328 will provide a logical high output signal only upon receipt of a second logical "high" input signal at its second input terminal 328b. The signal input terminal 328b of the AND gate 328 will only be activated at a logical "high" level by the decoder 330, if the binary code received by the decoder 330 identically matches (i.e. is in coincidence with) the preselected variation output signal received from the variation select switches 20.

The laundry machine cycle variation E1 has a binary code of 0 0 1 (corresponding to the V3 V2 V1 output signals of the PROM 40). Whenever the decoder 330 receives a binary encoded 0 0 1 signal, the decoder will provide a logical high output signal at the output terminal 330c to the second input terminal 328b of the AND gate 328, indicating coincidence of the output variation code from the PROM 40 and the encoded variation signal received from the variation select switches 20. Therefore, when the variation code of the instruction at relative address location "zero" is read (Table 2), there is a non-coincidence between the compared variation codes, causing the signal output from the OR gate 320 to appear at a logical "low" level which is translated by the invertor 334 to a logical "high" signal to enable the AND gate 636.

As previously discussed, the next clock pulse received by the AND gate 636 from the 30-Hz signal output of the counter 604 causes the AND gate 636 to toggle the six-bit binary counter 336 to advance the relative address of the PROM 40 instruction to be read, by one binary count (i.e. to relative address "one"). When the instruction at relative address "one" is read, a similar non-coincidence condition with respect to the variation codes will occur, causing the next clock pulse signal received by the AND gate 636 to toggle the binary counter 336, to advance the six-bit lower address of the PROM 40 to read the instruction appearing at relative address "two."

Referring to FIG. 2, it will be noted that when the signal output from the OR gate 320 indicates a variation code non-coincidence condition, the AND gate 332 applies a logical "low" or disable signal to the second enable input terminal "EN2" of the PROM 40. The second enable input terminal EN2 of the PROM 40 is connected, in the preferred embodiment, to enable that portion of the PROM 40 memory banks which contain the signal information of each memory instruction which is read out on the output function ports 02–09 of the PROM 40. In other words, when a memory instruction is being read, whose variation output code is non-coincident with the pre-set variation select code, none of the output function ports 02–09 of the PROM 40 is enabled for activating the respectively connected output circuits within the output decode/control and recycle functional block 50. The only output function port which has the capability of applying an enabling output signal during a variation non-coincidence condition, is the "01" terminal which controls the rapid spin or "extract" function.

When the binary address counter 336 advances reading of the PROM 40 instructions to relative address location "two," it will be noted (from Table 2) that the variation output code (V3 V2 V1) is 0 0 1 which correspond to the beginning or first instruction of the laundry machine cycle variation "E1." The variation output signal read from the PROM 40 V1–V3 output ports is applied to the decoder 330 which generates a logical "high" output signal at its output terminal 330c, for enabling the AND gate 328. The AND gate 328 responds to the "coincidence condition" by generating a logical "high" signal which is applied to the OR gate 320. The logical "high" signal is transmitted by means of the OR gate 320 to the AND gate 332 to provide an "enable" input signal to the second enable input terminal EN2 of the PROM 40, thus enabling read-out of all sixteen-bits of the memory instruction being read. The logical "high" output signal from the OR gate 320 is also inverted by the invertor 334 to disable AND gate 636, thereby stopping the rapid addressing advance through the memory instructions in the selected block of memory. The instruction appearing at relative address "two" will continue to be read for a duration of time determined by a combination of that "time" count set into the down counter 628 and the input toggle rate of the clock pulses received from either the counter 614 or the counter 616 through the OR gate 622.

The "time" input set into the presettable down counter 628 is derived directly from the "time" output ports T1–T4 of the PROM 40. Referring to Table 2, for the relative address "two," the T1 T2 T3 T4 output signal is 0 0 0 1, which in the preferred embodiment, corresponds to a binary count of eight. Therefore, the down counter 628 will count in binary to the count of eight, in response to input signals applied to its toggle TGL input terminal, after which it will provide a single clock output pulse to advance the six-bit binary counter 336. During the time interval in which the down counter 628 is advancing to the pre-set count, the output control circuit 50 and the remaining circuits within the controller will receive and respond to the nine output function control signals being read out from the output function ports 01–09 of the PROM 40, for the relative address location "two" (see Table 2).

Referring to Table 2, it will be noted that when the instruction at relative address location "two" is being read, the "drain" signal (output port 02) is at a logical "high", corresponding to a closed drain condition in the laundry tub. The "hot" water and the "low level" output signals (output ports 03 and 05 respectively) also appear at a logical "high" level, indicating that hot water is to be added to the laundry tub until the first predetermined relatively low liquid level is attained in the laundry tub. Referring to FIG. 4, it will be noted that the logical high "drain" signal directly activates the drain motor 506 to close the drain to the laundry tub. The logical "high" hot water signal applied by the conductor 18.3 enables the AND gate 508 to gate the triac 510 into a conducting mode for energizing the hot water solenoid valve 512 so as to open the hot water conduit (not illustrated) leading into the laundry tub. The logical "high" signal applied by the conductor 18.5 permits energization of the AND gate 524 and disables energization of the AND gate 532 during the hot water fill condition. When the first, relativey low, water level condition is attained within the laundry tub, the low-level sensing pressure switch 528 will provide a logical "high" output signal to enable the AND gate 524. The logical "high" output signal from the AND gate 524 is inverted by the inverter 534 to disable the AND gate 508, thus deactivating the triac 510 and closing the hot water conduit, thus preventing further addition of hot water into the laundry tub. Referring to Table 2 it will be noted that the output port S1 carries a logical "low," which is applied by means of the conductor 18.6 to the additive injection control circuits 540 to inject a relatively small amount of detergent into the laundry tub. It will be noted that whenever the AND gates 508 or 518 (FIG. 4) are enabled, corresponding to the condition when either hot or cold water is being inserted into the laundry tub, the counters 614 and 616 within the timing and control circuits will be disabled by the AND gate 608, which prevents toggling of the down counter 628. Accordingly, whenever water is being added to the laundry tub in a "fill" condition, the timing circuits are disabled. When the pressure switches 528 or 536 indicate that the proper water level has been attained in the laundry tub, the AND gates 508 and 518 are disabled, closing the appropriate solenoid valves and re-enabling the timer circuits by means of the AND gate 608.

Referring to Table 2, it will be noted that the "drain" signal output appearing at output port 02 of the PROM 40 comprises a logical "high" signal at relative address location "two," which enables counter 616 and disables counter 614 by means of signal flow through the conductor 18.2. Accordingly, once the initial hot water fill has been completed, the counter 616 provides clock pulse toggle signals to the down counter 628 at thirty second intervals. Since the preset "time" count from the T1-T4 time output ports of the PROM 40 comprises a binary eight count for the instruction at relative address location "two," as previously described, the down counter 628 will "count" through eight thirty second intervals before providing an output clock pulse to the address counter 336. This corresponds to a total time interval of four minutes, following the initial hot water fill step, which corresponds to the first "suds" step or operation indicated at the first line of Table 1. In the preferred embodiment, the laundry tub continuously rotates about its rotational axis in a generally slow or "tumble" rate of rotation, except when instructed by means of the "extract" output function (output port 01 of the PROM 40) to advance the rate of rotation to a fast spin or "extract" speed — all of which will be described in more detail hereinafter.

The output pulse provided to the address counter 336 by the down counter 628 after the four minute interval, causes the address counter 336 to increment the relative address to be read from the PROM 40 by one, thus advancing that instruction stored at relative address "three" (Table 2) for read-out. Referring to the truth table representation of the logical output signal for the relative address "three" instruction, it will be noted that all nine of the control signals appearing at the output function ports of the PROM 40 comprise logical "disable" signals. It will be recalled that a logical "high" signal at the 06 and 07 output ports comprises a "disable" signal to the respectively driven additive injection apparatus, whereas a logical "high" signal appearing at the output ports 08 and 09 would represent an "enabling" output signal. When the "drain" (output port 02) signal appears at a logical "low" level, the counter 614 is enabled while the counter 616 is disabled by the memory command transmitted by the conductor 18.2. The logical "low" drain signal also deactivates the triac 504 to de-energize the drain motor 506 (FIG. 4), thus opening the drain to the laundry tub. The counter 614 will provide toggle input pulses to the down counter 628 at five second intervals. Referring to Table 2, it will be noted that at relative address "three", the "time" input signal preset into the down counter 628 corresponds to a binary eight count. It will also be noted that the down counter 628 is reset each time a toggle input pulse is provided to the six-bit binary counter 336. Since the input toggle pulses to the down counter 628 from the counter 614 occur at five second intervals and since the count preset into the down counter 628 is a binary eight count, the down counter 628 will generate an output toggle pulse to the address counter 336 following a 40 second interval — corresponding to the "drain" step or operation of the Table 1 sequence of steps for execution of the laundry machine cycle "E1." Upon receipt of the toggle input pulse from the down counter 628, the address counter 336 will advance the six-bit lower address input signal to the PROM 40 to effect a read operation of that memory instruction located at relative address "four."

The variation output code for the relative address "four" instruction is coincident with the preselected E1 variation code, which once again disables the AND gate 636, and enables a read-out of the relative address "four" instruction for the full duration of the four-bit "encoded" signal. Referring to Table 2, the "time" output signal comprises 0 1 0 0 T1 T2 T3 T4) which corresponds to a binary "two" count which is preset into the down counter 628. The drain output signal (output port 02) is at a logical "high" level which effects a closing of the laundry tub drain, and also provides an "enable" input signal to the divide-by-thirty counter 616, while disabling the divide-by-five counter 614. Accordingly, the down counter 628 is toggled at 30 second intervals by the counter 616. The combination of the 30 second toggle intervals and the binary two count preset into the down counter 628 causes the down counter 628 to generate an output toggle pulse to the binary address counter 336 after a one minute time increment. Referring to Table 2, the hot water fill command (output port 03) appears at a logical high, and the output port 05 signal appears at a logical "low" which combine to represent a hot water fill of the laundry tub to the higher predetermined liquid level, sensed by the high level pressure switch 536 (FIG. 4). As was discussed previously, the timer circuits will be disabled during the hot water fill portion of the cycle by the disable signal applied to the second input terminal 608b of the AND gate 608 from the output decode/control and recycle curcuits 50. Immediately following the hot water fill step to the relatively higher liquid level, the timing circuits are re-enabled, causing the down counter 628 to begin sequencing through its preset binary two count. This portion of execution of the laundry machine cycle E1 corresponds to the third line "rinse" condition of Table 1. Following the one minute rinse step, the address counter 336 advances the input address signal for read-out of the memory instruction appearing at relative address location "five."

The variation code of relative address "five" is also coincident with the preselected E1 variation code, causing a complete execution of those instructions reflected by the truth table of Table 2. The output commands contained within the 16-bit instruction at relative address "five" correspond to a 40 second drain step or operation, identical to that previously described with respect to execution of the instruction at relative address location "three."

Following the 40 second drain operation, the memory is sequenced to read the instructions stored at relative address location "six," which corresponds to a "bleach" cycle. Referring to Table 2 for relative address location "six," the drain output signal at output port 02 is at a logical "high" level, causing the laundry tub drain to close. The output command at output port 03 is at a logical "high" level, which energizes the hot water solenoid 512 for adding hot water to the laundry tub. The signal at output port 05 is at a logical "high," corresponding to a "low level" fill condition. It will be recalled that during a hot or cold water fill step, the timer circuits will be temporarily disabled by means of the AND gate 608. Of the four additive injection control signals S1–S4, at relative address "six," the only signal output having an "enable" signal, appears at output port 08, which applies a command to the additive injection control circuits 540 to open a valve through which a neutralizer or bleach is injected into the laundry tub. This signal is delayed by circuitry (not illustrated) until the laundry tub has been filled with water. Following the hot water/low level fill, the counter 616 is enabled by means of the drain (output port 02) memory command, which provides toggle pulses at 30 second intervals to the down counter 628. Referring to the "time" output signals from the PROM 40, the "count" preset into the down counter 628 is 0 1 0 1 (T1 T2 T3 T4), corresponding to a binary ten count. Therefore, the down counter 628 will generate a toggle input pulse to the address counter 336 following a five minute bleach cycle. This laundry step of the program E1 is indicated as the fifth line of Table 1.

Following execution of the "bleach" instruction at relative address "six," the address counter 336 will sequence the PROM 40 for reading of that instruction located at relative address "seven." Referring to Table 2, for relative address "seven" it will be noted that the three digit variation code that will be read is 0 1 0 (i.e. V1 V2 V3), which will provide, when compared with the preset variation output signal from the variation select circuit 20, a non-coincidence condition. The non-coincidence condition will, as previously discussed, disable read-out of the 02–09 output function memory output signals and will enable the counter 604 to toggle the binary address counter 336 at a 30-Hz rate. The address counter 336 will sequentially advance addressing of the memory instructions identified in Table 2 as relative address locations "eight" through "twenty-four," until relative address "twenty-five" is reached. It should be noted that the skipped over instructions represent laundry step instructions for other program variations of the basic E program.

The variation code for that instruction stored at relative address location "twenty-five" is 1 0 1, corresponding to a binary 5. The binary 5 variation code is common to all variations of programs within that block of memory containing the basic laundry machine E cycles or programs. Input of the 1 0 1 variation code signals to the decoder 330 causes the decoder 330 to generate a logical "high" output signal at its seventh output terminal 330g, which is applied directly to the sixth input terminal 320f of the OR gate 320, once again signifying a coincidence condition. The coincidence condition, as previously discussed, causes AND gate 636 to be disabled and the instruction located at relative address "twenty-five" will be read for the duration of that time period corresponding to the four-bit time output 0 0 0 1 (T1 T2 T3 T4) which is preset into the down counter 628. It will be noted that the instructions appearing at relative address "twenty-five" corresponds to a 40 second drain function, as previously discussed.

Following execution of the 40 second drain operation, the address counter will advance the controller, as previously discussed, to read that instruction located at relative address "twenty-six." The instruction at relative address "twenty-six" corresponds to a "rinse" operation, as previously discussed, for a duration of one and one half minutes. Following the "rinse" operation, the instruction located at relative address "twenty-seven" is executed, which will be observed to comprise a 40 second "drain" operation. Following execution of the drain operation, the address counter 336 will effect a read-out of the instruction located at relative address "twenty-eight."

The instruction at relative address "twenty-eight," comprises a fast spin or "extract" operation. Referring to Table 2, it will be noted that at relative address "twenty-eight," the memory output commands dictate that the drain valve is in an open condition, and that the hot and cold water fill, and all of the additive injection control signals are disabled. Also, referring to FIG. 4, it will be noted that the signal command applied to PROM 40 output port 05 (the water level control command) has no effect when both the hot and cold water fill signals are disabled. The only output command of the instruction at relative address "twenty-eight" which is "enabled" is the 01 or the "extract" output command signal, which appears at a logical "high" level. To understand the extract or fast spin operation, a short description of the operation of the spin or tumble operation is in order.

Referring to FIGS. 3 and 4, it will be noted that whenever the divide-by-sixty counter 602 is enabled by the master enable signal carried by conductors 28.1, a 1-Hz signal is continuously applied by means of its first signal output terminal 602a and the conductor 26.2 to the divide-by-five counter 584 of the output decode/-control and recycle circuits 50. The output from the counter 584 provides input pulses at 5 second intervals to the AND gate 568 whose other input terminal is normally at a logical high level, such that the AND gate 568 normally provides clock input pulses to the decoder and divide-by-eight counter 570 at 5 second intervals. The counter 570 does not function in a true "divide-byx" manner but operates to take each received input pulse and to successively sequentially energize the eight signal output terminals 570a–570h, for the time interval between successively received input pulses. For example, in response to the first received pulse, the counter 570 will apply an output pulse of 5 seconds duration to the first output terminal 570a until another input pulse is received; in response to a second received input pulse, the counter will disable output 570a and will apply a continuous logical high signal to its second output terminal 570b, etc. It will be noted that there successive output terminals of the counter 570 are connected to the gate terminal of the triac 574 and that the three successive output terminals 570f–570h are directly connected to energize the gate terminal of the triac 580. It will also be noted that the two sets of three output terminals are separated by the fifth output terminals 570e, which unconnected, effects a 5 second pause between energization of those output circuits activated by the thyristor 574 and those activated by the thyristor 580. Similarly, the first output terminal 570a is unconnected and effects a 5 second pause following the activation of the output circuits by 580, before the successive energization of thyristor 574.

The thyristor 574 is connected to energize the forward contactor relay 576, which is operatively connected (not illustrated) to switch the power supply connections which energize the laundry machine tub rotating motor (not illustrated) into energizing engagement with the "forward" windings of the motor, causing rotation of the laundry tub at a relatively slow "tumble" speed, in a first or "forward" direction. Since the triac 574 is gated "on" for three successive 5 second intervals by the counter 570, the laundry tub will continue to rotate in the first or "forward" direction for 15 consecutive seconds. When the counter 570 energizes its fifth output terminal 570e for 5 seconds, the windings of the laundry machine motor will be de-energized during that 5 second interval, causing the laundry tub rotation to stop. Upon energization of the output terminal 570f of the counter 570, the triac 580 will be gated on. The triac 580 is connected to energize the "reverse" contactor relay 582, which is operatively connected (not illustrated) to switch the power supply connections which energize the laundry machine tub rotating motor (not illustrated), into energizing engagement with the "reverse" windings of the motor, causing rotation of the laundry tub at a relatively slow "tumble" speed in a second or "reverse" direction, which is opposite to the previously mentioned first or "forward" direction. Since the triac 580 is gated "on" for three successive 5 second intervals by the counter 570, the laundry tub will continue to rotate in the second or "reverse" direction for 15 consecutive seconds. Upon energization of the first 570a output terminals of the counter 570, once again, the windings of the laundry tub rotating motor will be de-energized, allowing the laundry tub rotation to stop. The overall result of the laundry tub rotation movement just described, is to rotate the laundry tub in a "forward" direction for 15 seconds, followed by a 5 second delay during which the laundry tub comes to rest, followed by rotation of the tub in a "reverse" direction for 15 seconds, followed by a 5 second delay during which the laundry tub comes to rest, followed by a repeat of the cycle. It will be noted, that as long as the master enable signal is available, and as long as an "extract" instruction is not being executed, and as long as an emergency stop condition has not been effected, the laundry tub will continuously rotate at the relatively slow or tumble speed, accordng to the repetitive "forward" and "reverse" manner just described.

With the foregoing background, the execution of the "extract" output command can be better understood. The logical "high" command signal appearing at the extract output port of the PROM 40 enables the divide-by-two counter 612 be means of the conductor 26.4. As indicated previously the manual switch 606 provides for the selection of either a relatively "short" or a "longer" extract spin operation. When the switch 606 is positioned as indicated, the primary toggle signal, which in part determines the duration of the extract step, is a 1-Hz signal. This condition corresponds to the extract choice having the shorter duration. If switch 606 is positioned so as to close the circuit between the counter 602 and the second stationary contact 606c2, then the divide-by-two counter 612 is enabled whenever the extract output command signal is received from the PROM 40. In the later case, the basic timing signal applied to the AND gate 608 will have a 0.5-Hz rate, which will increase the duration of the extract operation by a factor or two. Referring to the relative address "twenty-eight" instruction of Table 2, it will be noted that the "time" condition preset into the down counter 628 for this instruction is 0 0 1 0, corresponding to a binary 4 count. Since the "drain" output command at relative address instruction "twenty-eight" is at a logical "low" level, the divide-by-five counter 614 will be enabled and the divide-by-thirty counter 616 will be disabled. When the switch 606 is in the position illustrated in FIG. 3, the down counter 628 will be toggled at a rate of one pulse each five seconds, resulting in an output pulse from the down counter 628 at the end of a 20 second extract command. The logical "high" extract command signal is also applied (see FIG. 4) to the AND gates 544 and 546. The second input terminal 544b of the AND gate 544 normally appears at logical "high" signal, providing a logical low signal output on the conductor 26.3, to momentarily disable the counter 614 upon initial receipt of the extract command signal. However, if all of the continuous (to be described below) are satisfied for enabling an extract spin operation, the signal applied by the invertor 560 to the second input terminal 544b of the AND gate 544 will drop to a logical "low," re-enabling the counter 614.

Referring to the AND gates 546, 550 and 552, with related input circuitry, it will be noted that several conditions must be satisified before the laundry tub will be permitted to rotate at a fast or extract spin speed. The signal inputs to the AND gate 546 require that the load within the laundry tub be "in balance"; if this condition is satisfied, the balance switch 548 applies a logical "high" signal to the third input terminal 546c of the AND gate 546. The signal input to the second input terminal 546d requires that an "emergency stop" condition not be present within the system. If these two conditions are satisfied, upon receipt of an extract command from the memory, the AND gate 546b will be enabled, thus providing a logical "high" output signal to the first input terminal of the AND gate 550. AND gate 550 will be fully enabled only when the counter 570 provides an output signal at its second output terminal 570b. At that instant of time, the signal output of the AND gate 550 switches to a logical "high" level, which latches by means of the invertor 566 and the AND gate 568, the output signal of the counter 570 to maintain the logical "high" signal at the output terminal 570b until the AND gate 568 is re-enabled. The third condition which must be satisfied prior to an extract operation is that the laundry tub must be drained of any accumulated liquid, which is sensed by the empty tub sensor 554. The fourth condition which must be satisfied prior to an extract spin operation is that the drain must be in an open condition, which is insured by (see FIG. 3) disabling the divide-by-five counter 614, unless a logical "low" drain command signal is applied to the conductor 18.2. When all of the foregoing extract conditions have been satisfied, the AND gates 546, 550 and 552 will all be enabled, which will provide a logical "high" gating signal to the triac 556 and will simultaneously disable AND gate 544, thus re-enabling the AND gate 608 and the divide-by-five counter 614. Due to the inverter 560, when the triac 556 is gated to a conductive mode of operation, the triac 562, which controls the "tumble" or slower spin speed operation of the laundry tub rotating motor, will be disabled.

When the triac 556 is gated to a conductive mode of operation, the fast spin or extract relay 558 is energized, which is operatively connected (not illustrated) to switch the power supply connections which energize the laundry machine tube rotating motor (not illustrated) into energizing engagement with windings which cause the rotational speed of the motor to increase to the spin or extract speed of rotation. The extract spin condition will be maintained for the 20 second duration as determined by the down counter 628, after which time the address counter 336 will advance PROM memory read-out to the instructions stored at relative address location "twenty-nine," which corresponds to a one and one half minute rinse cycle.

Upon commencement of the relative address "twenty-nine" instruction, the extract output command signal will change to a logical "low level, which will disable AND gate 546, which will disable AND gate 550, which will re-enable AND gate 568, thus enabling counter 570 to resume its normal sequencing operation. Simultaneously AND gate 552 will be disabled, which will disable triac 556 and will enable by means of the inverter 560 the triac 562. When enabled, the triac 562 energizes the slow speed relay 564 which is operatively connected (not illustrated) to switch the power supply connections which energize the laundry machine tub rotating motor (not illustrated) into energizing engagement with a set of windings of the motor which are operable to cause rotation of the laundry tub at a relatively slow or "tumble" speed.

With reference to Tables 1 and 2, and the foregoing descriptions, execution of the remaining instructions comprising laundry machine cycle "E1" will be readily understood. To assist in following through the instruction sequence for relative address locations 30–37, the following sequence of execution applies:

Relative address "thirty" —40 second drain;
Relative address "thirty-one" —20 second extract operation;
Relative address "thirty-two" —3 minute final rinse, with addition of sour or softener additives (output function port 09);
Relative address "thirty-three" —40 second drain;
Relative address "thirty-four" —1 minute extract;
Relative address "thirty-five" —1 minute extract (continuation of previous step); and
Relative address "thirty-six" —1 minute extract (continuation of two previous instructions).

When the instruction at relative address location "thirty-seven" is read, a variation code of 0 1 1, which corresponds to a binary 6 is applied to one-of-eight decoder 330. Upon receipt of this variation code, the decoder 330 generates a logical "high" output signal at output terminal 330h, which is illustrated as unconnected in FIG. 2. This signal could be employed for activating various types of audible or other alarm indicators (not illustrated) to indicate the end of operative execution of the selected laundry machine cycle.

Referring to Table 2, the address counter 336 will rapidly cycle through the instruction at relative address location "thirty-eight," since the variation output code thereof provides a non-coincidence condition with the preselected variation code. The final instruction executed in the "E1" program variation is that instruction located at relative address location "thirty-nine," which has a variation output code of 1 1 1, corresponding to a binary 7. Upon receipt of the 1 1 1 input signal, the decoder 330 generates a logical "high" output signal at its output terminal 330a, which corresponds to a "program stop" signal. The program stop signal is applied (see FIG. 2) through the OR gate 312 to the reset R input terminal of the three and one-bit latch circuits 306 and 310. Upon receiving the reset command, the master enable signal is removed from the controller circuitry and the controller is ready to execute another laundry machine cycle by an operator of the machine.

The "emergency stop" and "recycle" circuitry (see top of FIG. 4), provides the operator of the controller the capability of immediately stopping execution of any program. The emergency stop switch 585 and the recycle switch 595 are configured for placement upon the master control console (not illustrated) which also houses the cycle select switches 10, for ready accessibility by the machine operator.

An operator initiates an "emergency stop" condition by closing the emergency stop switch 585, thus energizing the relay driver 589 through the AND gate 587, and simultaneously forwarding a disable output signal to the disable input terminal of the formula select gates 302 by means of the conductor 17.3. The formula select gates 302 are operative to disable the formula select gates 302 from accepting any subsequent input signals from the cycle select switches 10 except from that input select switch A–H whose associated laundry program was currently being executed at the time of initiation of the "emergency stop" condition. Upon energization, the relay driver energizes the coil 590a of the relay 590 to open the signal flow path to the output load bus energizing the output load functions. An emergency stop condition preserves the current program status when halting the program, and enables program restart from the instruction at which it was stopped, in response to operator input by depressing the appropriate input cycle select switch A–H, which was being executed at the time of initiating the emergency stop. Upon reselection of the appropriate input selector button, the formula select gates 302 provide a reset signal by means of the OR gate 308 and the conductor 17.1 to the one-bit latch 586 for removing the emergency stop disabling signal and allowing continued execution of the selected program from that program instruction relative address location at which the program was stopped.

An operator initiates a "recycle" condition by depressing the recycle switch 595, thus energizing the one-bit latch 596 and providing a reset input signal along the conductor 17.2 to the latches 306 and 310. A recycle condition causes the entire program to be reset to the beginning of the program, by disabling all memory commands, including the drain output command. Accordingly, both the emergency stop and the recycle conditions cause the drain to open. Restart of program execution is accomplished by an operator depressing the appropriate cycle select input button A–H. It will be noted that both the emergency stop and the recycle conditions provide a delayed signal by means of the delay element 594 to a door lock member (not illustrated) for preventing opening of the laundry tub door until the rotation of the laundry tub has come to a complete rest. The emergency stop delay condition is provided whenever the emergency stop is initiated during an "extract" condition; whereas the recycle delay signal is initiated in all recycle cases.

The present invention contemplates that a number of additional special features (not illustrated) may be added to the disclosed preferred embodiment controller circuitry, without departing from the spirit and scope of the present invention. For example, "no-bleach" switching circuitry may be added, which upon activation, would generate appropriate signals to defeat the "bleach" signal (memory output port 08) when it occurs during the selected laundry machine cycle execution. A "soak" option could also be readily included as a pushbutton feature which would generate a signal for filling the laundry tub with the drain closed for extended soaking periods. For such an option, appropriate circuitry could be added to disable the cycle select switches 10 whenever the soak option is enabled. A "hold" function could also be included as an option which upon activation would arrest the laundry machine cycle for continued execution of that particular laundry machine cycle currently being executed, by disabling the timing circuits (i.e. the presettable down counter), until an operator restarts the apparatus by, for example, activating the hold condition a second time. It will also readily be understood that over visual and/or audible alarms and indicators can be included to provide visual or audible output information related to the execution of various portions of the circuitry or related to execution of various steps during the laundry cycles.

From the above description of the preferred embodiment of the invention and its mode of operation, it will be understood that the present invention of an electronic laundry machine controller provides a highly reliable and efficient system by which an operator may, by the depression of a single button, select a laundry machine cycle which will be automatically executed by the laundry machine under complete electronic control. Each basic type or class of laundry machine cycle or program has a plurality of variations, whereby each of the program variations is pre-configurable for satisfying the specific requirements of laundering identifiable types of laundry for particular types of operator installations. The instructions comprising any variation of a laundry machine cycle, are fixed or hardwired in a programmable read only memory, with each basic type or class of laundry cycle or program being operatively contained within an identifiable and separately addressable storage block of the memory. Timing, decoding and comparator circuits control the selection of instructions from any particular block of memory storage locations associated with the selected laundry machine cycle, to automatically synthesize the complete laundry machine cycle selected, in accordance with a preselected variation of the basic laundry program. It is readily apparent, that with the present invention, an extremely large number of laundry cycles or programs can be pre-programmed into a single controller, which can rapidly be preset in the field for satisfying the specific laundering needs of the user. The error inherent in prior art systems, whether mechanical, electromechanical or electrical, in which the operator must provide a number of program synthesis inputs to the laundry machine controller, is thereby eliminated.

While a specific embodiment and application of the invention has been disclosed, it will be apparent to those skilled in the art in light of the foregoing description that other modifications and variations of the control system and its application fall within the spirit and scope of this invention. In particular, it will be understood that the principles of the present invention apply equally well to microprocessor controlled laundry machine controller applications. This description is intended to provide concrete examples of a single embodiment and certain variations thereof which clearly disclose the present invention. Accordingly, the present invention is not limited to any particular embodiment or specific application. All alternative, modifications and variations of the present invention which fall within the spirit and broad scope of the appended claims are covered.

TABLE 1

BASIC SEQUENTIAL STEPS FOR EXECUTION OF LAUNDRY MACHINE CYCLE "EI"

| Laundry Steps Or Operations | Step Duration | Water Temp. | Water Level | Additives |
|---|---|---|---|---|
| Suds | 4 min. | Hot | Low | Light Detergent |
| Drain | 40 sec. | — | — | — |
| Rinse | 1 min. | Hot | High | — |
| Drain | 40 sec. | — | — | — |
| Bleach | 5 min. | Hot | Low | Bleach |
| Drain | 40 sec. | — | — | — |
| Rinse | 1½ min. | Hot & Cold | High | — |
| Drain | 40 sec. | — | — | — |
| Extract | 20 sec. | — | — | — |
| Rinse | 1½ min. | Hot & Cold | High | — |
| Drain | 40 sec. | — | — | — |
| Extract | 20 sec. | — | — | — |
| Final Rinse | 3 min. | Hot & Cold | Low | Sour/Soft |
| Drain | 40 sec. | — | — | — |
| Extract | 3 min. | — | — | — |

TABLE 2

INSTRUCTION OUTPUT SIGNALS FOR A PORTION OF LAUNDRY MACHINE CYCLE "E" BLOCK OF MEMORY STORAGE

| RELATIVE ADDRESS | OUTPUT FUNCTION PORTS | | | | | | | | | VARIATION | | | TIME | | | |
|---|---|---|---|---|---|---|---|---|---|---|---|---|---|---|---|---|
| | EX 01 | DN 02 | HT 03 | CD 04 | LO 05 | S1 06 | S2 07 | S3 08 | S4 09 | V1 | V2 | V3 | T1 | T2 | T3 | T4 |
| 0 | 0 | 1 | 1 | 0 | 1 | 1 | 1 | 0 | 0 | 0 | 0 | 0 | 0 | 0 | 0 | 0 |
| 1 | 0 | 1 | 1 | 0 | 1 | 0 | 1 | 0 | 0 | 0 | 0 | 0 | 0 | 0 | 1 | 1 |
| 2 | 0 | 1 | 1 | 0 | 1 | 0 | 1 | 0 | 0 | 1 | 0 | 0 | 0 | 0 | 0 | 1 |
| 3 | 0 | 0 | 0 | 0 | 0 | 1 | 1 | 0 | 0 | 1 | 0 | 0 | 0 | 0 | 0 | 1 |
| 4 | 0 | 1 | 1 | 0 | 0 | 1 | 1 | 0 | 0 | 1 | 0 | 0 | 0 | 1 | 0 | 0 |
| 5 | 0 | 0 | 0 | 0 | 0 | 1 | 1 | 0 | 0 | 1 | 0 | 0 | 0 | 0 | 0 | 1 |

TABLE 2-continued

INSTRUCTION OUTPUT SIGNALS FOR A PORTION OF LAUNDRY MACHINE CYCLE "E" BLOCK OF MEMORY STORAGE

| RELATIVE ADDRESS | EX 01 | DN 02 | HT 03 | CD 04 | LO 05 | S1 06 | S2 07 | S3 08 | S4 09 | VARIATION | | | TIME | | | |
|---|---|---|---|---|---|---|---|---|---|---|---|---|---|---|---|---|
| | | | | | | | | | | V1 | V2 | V3 | T1 | T2 | T3 | T4 |
| 6 | 0 | 1 | 1 | 0 | 1 | 1 | 1 | 1 | 0 | 1 | 0 | 0 | 0 | 1 | 0 | 1 |
| 7 | 0 | 1 | 1 | 1 | 0 | 1 | 1 | 0 | 0 | 0 | 1 | 0 | 1 | 1 | 0 | 0 |
| 8 | 0 | 0 | 0 | 0 | 0 | 1 | 1 | 0 | 0 | 0 | 1 | 0 | 0 | 0 | 0 | 1 |
| 9 | 0 | 1 | 1 | 0 | 1 | 0 | 1 | 0 | 0 | 0 | 1 | 0 | 0 | 0 | 1 | 1 |
| 10 | 0 | 1 | 1 | 1 | 1 | 1 | 1 | 0 | 0 | 1 | 1 | 0 | 0 | 0 | 1 | 1 |
| 11 | 0 | 0 | 0 | 0 | 0 | 1 | 1 | 0 | 0 | 1 | 1 | 0 | 0 | 0 | 0 | 1 |
| 12 | 0 | 1 | 1 | 1 | 0 | 1 | 1 | 0 | 0 | 1 | 1 | 0 | 1 | 1 | 0 | 0 |
| 13 | 0 | 0 | 0 | 0 | 0 | 1 | 1 | 0 | 0 | 1 | 1 | 0 | 0 | 0 | 0 | 1 |
| 14 | 0 | 1 | 1 | 0 | 1 | 1 | 0 | 0 | 0 | 1 | 1 | 0 | 0 | 0 | 1 | 1 |
| 15 | 0 | 0 | 0 | 0 | 0 | 1 | 1 | 0 | 0 | 1 | 1 | 0 | 0 | 0 | 0 | 1 |
| 16 | 0 | 1 | 1 | 0 | 1 | 1 | 0 | 0 | 0 | 1 | 1 | 0 | 0 | 0 | 1 | 1 |
| 17 | 0 | 1 | 1 | 1 | 0 | 1 | 1 | 0 | 0 | 0 | 0 | 1 | 0 | 0 | 1 | 0 |
| 18 | 0 | 0 | 0 | 0 | 0 | 1 | 1 | 0 | 0 | 0 | 0 | 1 | 0 | 0 | 0 | 1 |
| 19 | 0 | 1 | 1 | 1 | 0 | 1 | 1 | 0 | 0 | 0 | 0 | 1 | 0 | 0 | 1 | 0 |
| 20 | 0 | 0 | 0 | 0 | 0 | 1 | 1 | 0 | 0 | 0 | 0 | 1 | 0 | 0 | 0 | 1 |
| 21 | 0 | 1 | 1 | 1 | 0 | 1 | 1 | 0 | 0 | 0 | 0 | 1 | 0 | 0 | 1 | 0 |
| 22 | 0 | 0 | 0 | 0 | 0 | 1 | 1 | 0 | 0 | 0 | 0 | 1 | 0 | 0 | 0 | 1 |
| 23 | 0 | 1 | 1 | 0 | 1 | 1 | 0 | 0 | 0 | 0 | 0 | 1 | 1 | 1 | 1 | 1 |
| 24 | 0 | 1 | 0 | 0 | 1 | 1 | 1 | 0 | 0 | 0 | 0 | 1 | 1 | 1 | 1 | 1 |
| 25 | 0 | 0 | 0 | 0 | 0 | 1 | 1 | 0 | 0 | 1 | 0 | 1 | 0 | 0 | 0 | 1 |
| 26 | 0 | 1 | 1 | 1 | 0 | 1 | 1 | 0 | 0 | 1 | 0 | 1 | 1 | 1 | 0 | 0 |
| 27 | 0 | 0 | 0 | 0 | 0 | 1 | 1 | 0 | 0 | 1 | 0 | 1 | 0 | 0 | 0 | 1 |
| 28 | 1 | 0 | 0 | 0 | 0 | 1 | 1 | 0 | 0 | 1 | 0 | 1 | 0 | 0 | 1 | 0 |
| 29 | 0 | 1 | 1 | 1 | 0 | 1 | 1 | 0 | 0 | 1 | 0 | 1 | 1 | 1 | 0 | 0 |
| 30 | 0 | 0 | 0 | 0 | 0 | 1 | 1 | 0 | 0 | 1 | 0 | 1 | 0 | 0 | 0 | 1 |
| 31 | 1 | 0 | 0 | 0 | 0 | 1 | 1 | 0 | 0 | 1 | 0 | 1 | 0 | 0 | 1 | 0 |
| 32 | 0 | 1 | 1 | 1 | 1 | 1 | 1 | 0 | 1 | 1 | 0 | 1 | 0 | 1 | 1 | 0 |
| 33 | 0 | 0 | 0 | 0 | 0 | 1 | 1 | 0 | 0 | 1 | 0 | 1 | 0 | 0 | 0 | 1 |
| 34 | 1 | 0 | 0 | 0 | 0 | 1 | 1 | 0 | 0 | 1 | 0 | 1 | 0 | 0 | 1 | 1 |
| 35 | 1 | 0 | 0 | 0 | 0 | 1 | 1 | 0 | 0 | 1 | 0 | 1 | 0 | 0 | 1 | 1 |
| 36 | 1 | 0 | 0 | 0 | 0 | 1 | 1 | 0 | 0 | 1 | 0 | 1 | 0 | 0 | 1 | 1 |
| 37 | 0 | 0 | 0 | 0 | 0 | 1 | 1 | 0 | 0 | 0 | 1 | 1 | 1 | 0 | 0 | 0 |
| 38 | 0 | 0 | 0 | 0 | 0 | 1 | 1 | 0 | 0 | 0 | 1 | 1 | 1 | 0 | 0 | 0 |
| 39 | 0 | 0 | 0 | 0 | 0 | 1 | 1 | 0 | 0 | 1 | 1 | 1 | 0 | 0 | 0 | 0 |

We claim:

1. An electronic controller for laundry machines of the type having a plurality of electrically controlled subsystems each operable to perform a unique laundering function, comprising:

(a) read only memory means for storing a plurality of uniquely addressable logical instructions, and for providing logical memory output signals responsive to addressing of said instructions, wherein at least a plurality of said instructions each comprises a plurality of preset logical laundry function control commands arranged in a plurality of memory bits which are commonly activated upon addressing of said instruction to respectively each provide one of said logical memory output signals indicative of that said laundry function control command preset into that said memory bit;

(b) laundry cycle select means for producing in response to manual activation, a plurality of cycle select output signals, said laundry cycle select means having a plurality of switching members each identifiably associated with a different laundry cycle, each of said switching members being operable in response to a single manual activation stimulus to produce one of said cycle select output signals, which is uniquely identified with that activated switching member;

(c) laundry cycle execution means operatively connected with said laundry cycle select means and with said read only memory means, responsive to receipt of a single one of said cycle select output signals, for selectively addressing, in timed manner, a plurality of said memory instructions, to synthesize a complete laundry cycle identifiably corresponding to that activated said cycle select switching member from which said cycle select output signal was received; and (d) output circuit means operatively connecting said read only memory means with the plurality of subsystems of the laundry machine, for automatically activating the plurality of subsystems in response to said logical memory output signals, to execute a plurality of distinct laundering operations which collectively comprise the selected laundry cycle.

2. An electronic laundry machine controller as recited in claim 1, wherein said memory means is further characterized by those said instructions which are preset with said laundry function control commands each including at least one memory bit preset to contain logical timing information, and being operable upon activation to provide a logical memory timing output signal; and wherein said laundry machine execution means includes timing control means operatively connected to receive said memory timing output signals for controlling in response thereto, the time duration of activation of said respectively addressed memory instructions.

3. An electronic laundry machine controller as recited in claim 1, wherein said memory means is functionally subdivided into a plurality of blocks of said instructions, wherein those said instructions within each said block are identifiably associated with a unique one of said laundry cycles, said instructions within at least one of said blocks, being preset with sufficient said laundry function control commands for enabling synthesis of a plurality of execution variations of that laundry cycle associated with said one instruction block; and wherein said laundry cycle execution means includes:

(a) first addressing means responsive to said received cycle select output signal for selectively addressing only those instructions within that memory instruction block which is identifiably associated with the activated cycle select switching member; and (b) manually presettable cycle variation select circuit means operatively connected with said one instruction block and responsive to receipt of that said cycle select output signal identifiably associated with said one instruction block for selectively addressing in timed sequential manner only those said instructions within said one instruction block that correspond to one manually preselected variation of said laundry cycle.

4. An electronic laundry machine controller as recited in claim 3, wherein each said instruction within said one instruction block includes at least one memory variation bit preset to contain a variation identifier code classifying that instruction with one of said plurality of laundry cycle execution variations, each said memory variation bit being operable when actively read upon addressing to provide a logical memory variation output signal representative of said variation identifier code preset into that memory variation bit; and wherein said variation select circuit means comprises:

(a) manually settable variation switching means for providing, in response to manual selection and in response to receipt of that said cycle select output signal identifiably associated with said one instruction block, a plurality of presettable variation output signals, each presettable variation output signal being identifiably associated with a corresponding one of said laundry cycle execution variations, said variation switching means being operable to produce only one said presettable variation output signal at a time; and (b) variation addressing circuit means operatively connected to receive said presettable variation output signal and said memory variation output signals from actively addressed instructions within said one instruction block, for comparing said presettable variation output signal and said memory variation output signals for actively reading in timed sequential manner only those instructions having a said preset variation identifier code corresponding with said presettable variation output signal.

5. An electronic laundry machine controller as recited in claim 1, wherein said memory means if further characterized by those said instructions which are preset with laundry function control commands being functionally grouped into commonly addressable blocks of said instructions, each of said instruction blocks being identifiably associated with a unique one of said selectable laundry cycles, wherein said instructions within each said block are ordered by successive addresses so as to produce when sequentially read that ordered progression of said logical memory output signals required to execute said respectively associated laundry cycle; and wherein said laundry cycle execution means comprises:

(a) first addressing means responsive to said received cycle select output signal for electrically enabling that one of said memory instruction blocks identifiably associated with the activated cycle select switching member; and (b) second addressing means responsive to said received cycle select output signal for sequentially addressing in timed controlled manner the successively addressable instructions within said enabled memory instruction block.

6. An electronic laundry machine controller as recited in claim 5, wherein said memory means is further characterized by said instructions within at least one of said instruction blocks being preset with sufficient laundry function control commands for enabling synthesis of a plurality of execution variations of that basic laundry cycle associated with said one instruction block; and wherein said laundry cycle execution means further includes manually presettable variation select circuit means operatively connected with said second addressing means and responsive to receipt of said cycle select output signal identifiably associated with said one instruction block and to a manual input selection corresponding to one of said cycle execution variations, for controlling activation of said second addressing means so as to selectively address in timed sequential manner those ones of said instructions within said one instruction block that correspond to the manually preselected execution variation of said selected laundry cycle.

7. An electronic laundry machine controller for laundry machines of the type having a plurality of electrically controlled subsystems each operable to perform a unique laundering function, comprising:

(a) read-only memory means for storing a plurality of memory instructions, said memory means having a plurality of selectable memory storage blocks each associated with a different basic laundry cycle, each of said memory storage blocks comprising memory instruction storage means for storing a plurality of addressable memory instructions, whereby each instruction comprises a plurality of presettable bits of logical control information;

(b) manually activated laundry cycle select means having a plurality of select switching members each uniquely associated with different one of said memory storage blocks, for operatively enabling, in response to manual stimulation of said select switching members. Corresponding ones of said memory storage blocks, said laundry cycle select means including means for preventing concurrent operative enabling of more than one said memory storage block at a time;

(c) variation select switching means for providing a plurality of variation select output signals for each of said memory storage blocks, said variation select switching means being operable, responsive to manual preselection, to produce only one of said plurality of variation output signals at a time for the enabled one of said memory storage blocks;

(d) laundry cycle execution means operatively connected to said variation select switching means, to said laundry cycle select means and to said memory means for synthesizing a unique laundry cycle identifiably associated with a preselected variation of an operator selected laundry cycle, said laundry cycle execution means including circuit means responsive to said variation select output signal associated with said enabled memory storage block for selectively operatively addressing, in time controlled manner, said plurality of memory instructions within said enabled memory storage block, to provide a timed sequence of laundry function output commands from the read instructions; and (e) output laundry function control means operatively connected to receive said plurality of logical function output commands for automatically activating a plurality of laundry machine subsystems in response thereto, to execute a corresponding plurality of distinct laundering operations which collectively comprise the preselected execution variation of the selected laundry cycle.

8. An electronic laundry machine controller as recited in claim 7, wherein at least one said bit of those instructions within said selectable memory blocks is preset to contain logical timing control information which produces a logical memory timing output signal upon active reading thereof; and wherein said laundry cycle execution means includes timing control circuit means operatively connected to receive said memory timing output signals for controlling in response thereto the time duration of activation of said respectively addressed memory instructions.

9. An electronic laundry machine controller as recited in claim 8, wherein at least one said bit of those said instructions within said selectable memory blocks is preset to contain a variation identifier code classifying that instruction with one of said plurality of laundry cycle execution variations, each said memory variation bit being operable when read upon active addressing of the respective instruction, to provide a logical memory variation output signal representative of said variation identifier code preset into that memory variation bit; and wherein said laundry cycle execution means includes variation addressing circuit means operatively connected to receive said memory variation output signals from actively addressed instructions and said presettable variation output signals from said variation select switching means for comparing said received memory and presettable variation output signals and for selectively overriding said timing control means responsive to the concurrent status of said comparison.

10. An electronic laundry machine controller as recited in claim 9, wherein said variation addressing circuit means comprises:
 (a) comparator circuit means for comparing said received memory and presettable variation output signals, said comparator circuit means being operable to provide a first comparison output signal upon coincidence of said received compared signals and being operable to provide a second comparison output signal upon non-coincidence of said received compared signals; and
 (b) override circuit means operatively connected with said timing control circuit means and responsive to receipt of said first and said second comparison signals to enable said timing control circuit means for normal operation thereof whenever said first comparison output signal is received, and to override normal operation of said timing control circuit means upon receipt of said second comparison output signal, said override circuit means being operable when overriding said timing control circuit means, to prevent active read out of said laundry function output commands for that addressed instruction concurrently being read and to advance active addressing of said memory instruction to the next successive addressable memory instruction within said enabled memory storage block.

11. An electronic laundry machine controller as recited in claim 10, wherein said override circuit means further includes circuit means responsive to receipt of said second comparison output signal to inhibit application of said laundry function output command signals to said output laundry function control means whenever a non-coincidence condition between said memory and said presettable variation output signals occurs.

12. An electronic laundry machine controller for automatically synthesizing timed sequences of electrical logical commands suitable for activating a plurality of subsystems of a laundry machine, to execute uniquely selectable laundry cycles, comprising:
 (a) read only memory means for storing a plurality of preset logical instructions ordered by addressably identifiable groups of said instructions at consecutive memory location addresses so as to produce when read a large number of uniquely different laundry cycles, one each of said instruction groups being unquely associated with one each of said uniquely different laundry cycles, each instruction comprising a plurality of memory bits preset with logical laundry function control commands and being operable when read to provide logical memory output signals indicative of said preset laundry function control commands;
 (b) manually activated laundry cycle select means for enabling manual selection and initiation of one of said available laundry cycles by means of a single manual input selection, comprising a plurality of selection switching members each identifiably associated with a different one of said laundry cycles and each operatively connected to respectively address when manually activated, that instruction within the respectively associated group of instructions, which corresponds to the first memory instruction of the selected laundry cycle, said laundry select means including means for enabling operatively input selection of only one said selection switching members at a time; and
 (c) laundry cycle execution means responsive to said input selection by said laundry cycle select means to consecutively address and read, in timed sequential manner, those memory instructions within said selected groups of memory instructions, to synthesize a complete laundry cycle identifiably corresponding to that activated said laundry cycle select switching member, said sequential reading of said selected group intructions providing a timed sequence of said logical memory output signals indicative of said preset laundry function control commands.

13. An electronic laundry machine controller, for use in a laundry machine of the type having a plurality of subsystems responsive to received electrical commands for executing a plurality of laundering functions, comprising:
 (a) read only memory means for storing a plurality of logical control instructions arranged in a plurality of instruction storage blocks, each of said blocks being functionally associated with a different basic laundry cycle, each said instruction comprising a plurality of read only memory bits preset with a plurality of laundry function control commands and with at least one variation identifier command said variation identifier command identifiably associating that instruction of which it is a part with one of a plurality of possible execution variations of the basic laundry cycle associated with that said storage block; said memory having a plurality of signal output ports at which logical memory output signals are applied upon active reading of said memory bits of said instructions;

(b) first switching means for operatively selecting, in response to manual activation, one of said instruction storage blocks, said first switching means having select circuit means for providing unique laundry cycle selection output signals each identifiably associated with a different one of the selectable basic laundry cycles;

(c) presettable second switching means for preselecting one of said execution variations of each said basic laundry cycle, said second switching means having circuit means for providing in response to individual manual preselection stimuli a unique preset variation output signal for each said selectable instruction storage block;

(d) timing and control circuit means operatively connected to said second switching means and said read only memory means for controlling the time duration of sequential reading of said memory instructions, comprising:

(i) comparator circuit means operatively connected to receive from a memory instruction being read that said logical memory output signal corresponding to said variation identifier command preset in that instruction and to receive from said second switching means said preset variation output signal corresponding to the enabled instruction block of said memory, for comparing said memory output variation signal with said second switching means preset variation output signal and for producing comparison output signals in response thereto; said comparator circuit means being operable to produce a first comparison output signal upon coincidence of said compared signals and being operable to produce a second comparison output signals upon non-coincidence of said compared signals; and (ii) timing circuit means responsive to said comparison output signals for producing timing advance signals, said timing circuit means being operable in response to receipt of said first comparison output signal to produce a first timing advance signal and being operable in response to receipt of said second comparison output signal to produce a second timing advance signal; and (e) addressing circuit means operatively connected with said read only memory means, said first switching means and said timing and control means for selectively actively reading said read only memory instructions, said addressing circuit means comprising:

(i) first circuit means responsive to receipt of said laundry cycle selection output signals for electrically enabling for reading those said instructions within an associated one of said instruction storage blocks; and (ii) sequencing circuit means responsive to receipt of said timing advance signals for actively reading in timed sequential manner said enabled instructions, said sequencing circuit means being operable in response to receipt of said first timing advance signal to successively actively read in timed sequence the instructions within that enabled instruction block in a predetermined timed manner corresponding to the real time execution requirements of said laundry function control commands stored within said respectively read instructions, and being operable in response to receipt of said second timing advance signal to successively actively sequence through reading of the instructions within the enabled instruction block at a relatively rapid rate so as to prevent real time execution of said laundry function control commands stored within said respectively read instructions; and (f) output circuit means operatively connected to receive said logical memory output signals from said signal output ports of said memory for automatically activating a plurality of subsystems of a laundry machine in response to said logical memory output signals, whereby the timed ordered reading of said enabled memory instructions provides to the laundry machine subsystems that combination of logical memory output signals required for execution in time sequential manner that plurality of distinct laundering operations which collectively comprise the preselected variation of the selected basic laundry cycle.

14. An electronic laundry machine controller as recited in claim 13, wherein said select circuit means of said first switching means comprises a plurality of manually operable selection switches each identifiably associated with a different one of the selectable basic laundry cycles, each of said selection switches being operable upon manual activation to provide one of said unique laundry cycle selection output signals.

15. An electronic laundry machine controller as recited in claim 14, wherein said first switching means further includes lockout circuit means operatively connected to said select circuit means and responsive to a first manual activation of any of said selection switches for inhibiting production of more than one of said unique laundry cycle selection output signals throughout the active execution of that laundry cycle associated with the first activated selection switch.

16. An electronic laundry machine controller as recited in claim 15, further including recycle circuit means operatively connected with said lockout circuit means for resetting said lockout circuit means to enable a successive manual reselection of any one of the basic laundry cycles through a successive manual activation of one of said selection switches.

17. An electronic laundry machine controller as recited in claim 16, wherein said recycle circuit means comprises automatic recycle circuit means operatively connected to monitor reading of said memory instructions, for resetting said lockout circuit means whenever the last instruction within an enabled instruction block has been actively read.

18. An electronic laundry machine controller as recited in claim 17, wherein said recycle circuit means further includes manual recycle circuit means for automatically resetting said lockout circuit means in response to a manual reset input stimulus, comprising:

(a) a manual reset switch operable to provide a reset output signal upon manual activation thereof; and (b) circuit means operatively connected with said addressing circuit means and with said lockout circuit means and responsive to receipt of said reset output signal for resetting said lockout circuit means and for preventing further ordered reading of those instructions within the last enabled said memory instruction block.

19. An electronic laundry machine controller is recited in claim 13, further including emergency stop circuit means operatively connected with said addressing circuit means for temporarily inhibiting further successive reading of those instructions within the enabled instruction block, comprising:
  (a) manually operated emergency stop circuit means responsive to a manual input stimulus to provide an emergency stop output signal;
  (b) hold circuit means operatively connected to receive said emergency stop signal in response thereto for temporarily disabling said addressing circuit means to prevent successive reading of instructions within said enabled instruction block; and
  (c) manually activated restart circuit means operatively connected with said hold circuit means and responsive to a manual restart input stimulus to override said hold circuit means, thus enabling said addressing circuit means to resume successive reading of said instructions within the enabled instruction block, beginning with the reading of that instruction which was last read at the time the manually operable emergency stop circuit means was activated.

20. An electronic laundry machine controller as recited in claim 13, wherein said presettable second switching means comprises a plurality of manual variation selection switches disposed within the laundry machine so as to be normally inaccessible to the operator making the basic laundry cycle selection through said first switching means, each of said manual variation selection switches being operatively associated with a different one of said basic laundry cycles and being operable to produce one of said unique variation output signals from a plurality of such variation output signals in response to manual selection of said variation selection switch, whereby that one of said variation output signals produced corresponds to that cycle execution variation manually preselected on that manual variation selection switch.

21. An electronic laundry machine controller as recited in claim 13, wherein at least one of said read only memory bits of said instructions is preset with a time control command, readable at said memory output ports, wherein said addressing circuit means is operatively connected to receive from a said memory instruction being read that said logical memory output signal corresponding to said time control command preset in that instruction, and is operatively responsive thereto when in receipt of said first timing output signal to actively read that instruction currently being read for a time duration corresponding to the time control command preset within that said instruction.

22. An electronic laundry machine controller as recited in claim 13, wherein at least one of said read only memory bits of said instructions is preset with a time control command, readable at said memory output ports; and wherein said timing circuit means comprises:
  (a) a plurality of pulse repetition generating circuits each operative to produce an output pulse train of predetermined pulse repetition rate; and
  (b) selection and counting circuit means operatively connected to receive said comparison output signals and to receive that logical memory output signal corresponding to the preset time control command of an instruction currently being read, responsive to said received signals for counting selected ones of said output pulse train signals and for producing said timing advance signals in response to said pulse count.

23. An electronic laundry machine controller, for use in a laundry machine of the type having a plurality of subsystems responsive to received electrical commands for executing a plurality of laundering functions, comprising:
  (a) read only memory means for storing a plurality of logical control instructions arranged in a plurality of instruction storage blocks, each of said blocks being functionally associated with a different basic laundry cycle, each said instruction comprising a plurality of read only memory bits preset with a plurality of laundry function control commands and with at least one variation identifier code, said variation identifier code identifiably associating that instruction of which it is a part which one of a plurality of possible execution variations of the basic laundry cycle associated with that instruction storage block; said memory having a plurality of signal output ports at which logical memory output signals are applied upon active reading of said memory bits of said instructions;
  (b) first switching means for operatively selecting, in response to manual activation, one of said instruction storage blocks, said first switching means having circuit means for providing unique laundry cycle selection output signals each identifiably associated with a different one of the selectable basic laundry cycles;
  (c) presettable second switching means for preselecting one of said execution variations of each said basic laundry cycle, said second switching means having circuit means for providing in response to individual manual preselection stimuli a unique preset variation output signal for each said selectable instruction storage block;
  (d) comparator circuit means operatively connected to receive from that said memory instruction currently being read, said logical memory output signal corresponding to said variation identifier code preset in that instruction and to receive from said second switching means said preset variation output signal corresponding to the enabled instruction block of said memory, for comparing said memory output variation code signal with said second switching means preset variation output signal and for producing comparator output signals in response thereto; said comparator circuit means being operable to produce a first comparator output signal upon coincidence of said compared signals and being operable to produce a second comparator output signal upon non-coincidence of said compared signals;
  (e) addressing circuit means operatively connected with said read only memory means, said first switching means and said comparator circuit means for selectively actively reading said read only memory instructions, said addressing circuit means comprising:
    (i) block selection circuit means responsive to receipt of said laundry cycle selection output signals for selectively electrically enabling for reading those said instructions within that one of said instruction storage blocks associated with the currently received laundry cycle selection output signal; and
    (ii) instruction addressing circuit means responsive to receipt of said comparator output signals for actively addressing in timed ordered manner those said instructions within the selected instruction storage block, whereby each said instruction is operatively read upon addressing by said instruction addressing circuit means; said instruction addressing circuit means being operable in response to receipt of said first comparator output signal to successively actively read in timed ordered manner said instructions within that enabled instruction block in a predetermined timed manner corresponding to the real time execution requirements of said laundry function control commands read from respectively addressed instructions, and being operable in response to receipt of said second comparator output signal to address in relatively rapid successive manner those instructions within the enabled instruction block so as to prevent real time execution of said laundry function control commands stored within those respectively addressed instructions; and (f) output circuit means operatively connected to receive said logical memory output signals from said signal output ports of said memory for automatically activating a plurality of subsystems of a laundry machine in response to said logical memory output signals, whereby the timed ordered reading of said selectively addressed memory instructions provides to the laundry machine subsystems that combination of logical memory output signals required for executing in time sequential manner that plurality of distinct laundering operations which collectively comprise the preselected variation of the selected basic laundry cycle.

24. An electronic laundry machine controller, as recited in claim 23, wherein at least one of said read only memory bits of said instructions is preset with a time control command, readable at said memory output ports; and whereby said instruction addressing circuit means includes circuit means operatively connected to receive that logical memory output signal corresponding to the time control command preset within that instruction currently being addressed, and responsive to receipt of said first comparator signal to maintain active addressing of that instruction currently being read for a time duration corresponding with said received logical timing control command memory output signal, whenever said first comparator output signal is concurrently received.

* * * * *